United States Patent
Muruganathan et al.

(10) Patent No.: US 12,156,209 B2
(45) Date of Patent: *Nov. 26, 2024

(54) METHOD FOR DIFFERENTIATING MULTIPLE PHYSICAL DOWNLINK SHARED CHANNEL (PDSCH) TRANSMISSION SCHEMES

(71) Applicant: Telefonaktiebolaget LM Ericsson (publ), Stockholm (SE)

(72) Inventors: Siva Muruganathan, Stittsville (CA); Sebastian Faxér, Stockholm (SE); Mattias Frenne, Uppsala (SE); Shiwei Gao, Nepean (CA); Simon Järmyr, Skarpnäck (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/867,168

(22) Filed: Jul. 18, 2022

(65) Prior Publication Data
US 2023/0048243 A1 Feb. 16, 2023

Related U.S. Application Data

(63) Continuation of application No. 17/600,000, filed as application No. PCT/IB2020/053027 on Mar. 30, 2020, now Pat. No. 11,395,319.

(Continued)

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04W 72/0446* (2013.01); *H04W 72/23* (2023.01); *H04W 72/51* (2023.01)

(58) Field of Classification Search
CPC . H04W 72/1273; H04W 72/51; H04W 72/23; H04W 72/0446; H04L 5/0051
(Continued)

(56) References Cited

U.S. PATENT DOCUMENTS 11,224,065 B2  1/2022  Jiang et al.
11,395,319 B2 * 7/2022  Muruganathan ...... H04W 72/51
(Continued)

FOREIGN PATENT DOCUMENTS

CN    108293242 A    7/2018
EP    2717502 A1    4/2014
(Continued)

OTHER PUBLICATIONS

Author Unknown, "Technical Specification Group Radio Access Network; NR; Physical channels and modulation (Release 15)," Technical Specification 38.211, Version 15.4.0, Dec. 2018, 96 pages.
(Continued)

*Primary Examiner* — Peter G Solinsky
(74) *Attorney, Agent, or Firm* — Withrow & Terranova, PLLC

(57) ABSTRACT

A method for differentiating multiple Physical Downlink Shared Channel (PDSCH) transmission schemes. In a non-limiting example, the PDSCH transmission schemes include a spatial multiplexing transmission scheme, a frequency multiplexing transmission scheme, a slot-based time multiplexing transmission scheme, and a mini-slot-based time multiplexing transmission scheme. In examples discussed herein, a User Equipment (UE) can be configured to differentiate the PDSCH transmission schemes based on information indicated in Downlink Control Information (DCI) for scheduling a PDSCH transmission, information signaled to the UE via a higher layer configuration, and/or capability
(Continued)

signaling indicated from the UE to a network. By differentiating the PDSCH transmission schemes, the UE can efficiently receive a data transmission(s) from multiple Transmission/Reception Points (TRPs).

17 Claims, 19 Drawing Sheets

Related U.S. Application Data

(60) Provisional application No. 62/826,392, filed on Mar. 29, 2019.

(51) Int. Cl.
*H04W 72/0446* (2023.01)
*H04W 72/23* (2023.01)
*H04W 72/51* (2023.01)

(58) Field of Classification Search
USPC .......................................................... 370/329
See application file for complete search history.

(56) References Cited

U.S. PATENT DOCUMENTS

| | | | |
|---|---|---|---|
| 2014/0119266 | A1 | 5/2014 | Ng et al. |
| 2015/0098369 | A1 | 4/2015 | Song et al. |
| 2018/0103433 | A1 | 4/2018 | Li et al. |
| 2018/0183556 | A1 | 6/2018 | Shin et al. |
| 2021/0282182 | A1 | 9/2021 | Nogami et al. |
| 2022/0007406 | A1 | 1/2022 | Matsumura et al. |
| 2022/0014299 | A1 | 1/2022 | Ji et al. |
| 2022/0015085 | A1 | 1/2022 | Zhang et al. |

FOREIGN PATENT DOCUMENTS

| | | | |
|---|---|---|---|
| EP | 2765723 | B1 | 5/2016 |
| EP | 2866371 | B1 | 11/2017 |
| EP | 2501071 | B1 | 1/2018 |
| EP | 3651397 | A1 | 5/2020 |
| ID | 201702510 | A | 3/2017 |
| KR | 20180127154 | A | 11/2018 |
| KR | 20180137415 | A | 12/2018 |
| KR | 20190010507 | A | 1/2019 |
| KR | 20190017675 | A | 2/2019 |
| KR | 20190017731 | A | 2/2019 |
| WO | 2015142664 | A1 | 9/2015 |
| WO | 2016208991 | A1 | 12/2016 |
| WO | 2017222277 | A1 | 12/2017 |
| WO | 2018143784 | A1 | 8/2018 |
| WO | 2019050913 | A1 | 3/2019 |
| WO | 2020096795 | A1 | 5/2020 |

OTHER PUBLICATIONS

Author Unknown, "Technical Specification Group Radio Access Network; NR; Multiplexing and channel coding (Release 15)," Technical Specification 38.212, Version 15.4.0, Dec. 2018, 100 pages.
Author Unknown, "Technical Specification Group Radio Access Network; NR; Physical layer procedures for control (Release 15)," Technical Specification 38.213, Version 15.4.0, Dec. 2018, 104 pages.
Author Unknown, "Technical Specification Group Radio Access Network; NR; Physical layer procedures for data (Release 15)," Technical Specification 38.214, Version 15.4.0, Dec. 2018, 102 pages.
Ericsson, "R1-1902540: On multi-TRP and multi-panel," Third Generation Partnership Project (3GPP), TSG RAN WG1 Meeting #96, Feb. 25-Mar. 1, 2019, 11 pages, Athens, Greece.
Ericsson, "R1-1902859: Multi-TRP diversity strategies at 4 GHZ," Third Generation Partnership Project (3GPP), TSG RAN WG1 Meeting #96, Feb. 25-Mar. 1, 2019, 5 pages, Athens, Greece.
Ericsson, "R1-1904750: On multi-TRP and multi-panel," Third Generation Partnership Project (3GPP), TSG RAN WG1 Meeting RAN1#96-bis, Apr. 8-12, 2019, 18 pages, Xi'an, China.
Ericsson, "R1-1905163: Additional system-level results on NC-JT with different codeword to layer mappings," Third Generation Partnership Project (3GPP), TSG RAN WG1 Meeting RAN1#96-bis, Apr. 8-12, 2019, 2 pages, Xi'an, China.
Ericsson, "R1-1905164: Link-level results on the codeword-to-layer mapping for single-PDCCH NC-JT," Third Generation Partnership Project (3GPP), TSG-RAN WG1 Meeting #96bis, Apr. 8-12, 2019, 3 pages, Xi'an, China.
Ericsson, "R1-1905165: Performance comparison of different RV combinations for SDM and FDM based multi-TRP schemes," Third Generation Partnership Project (3GPP), TSG RAN WG1 Meeting #96bis, Apr. 8-12, 2019, 3 pages, Xian, China.
Ericsson, "R1-1905166: NC-JT performance with layer restriction between TRPs," Third Generation Partnership Project (3GPP), TSG RAN WG1 Meeting #96bis, Apr. 8-12, 2019, 5 pages, Xian, China.
Ericsson, "R1-1905167: On the number of TRPs for high reliability at 4 GHZ," Third Generation Partnership Project (3GPP), TSG RAN WG1 Meeting #96bis, Apr. 8-12, 2019, 6 pages, Xi'an, China.
Ericsson, "R1-1905168: Performance evaluation of NC-JT with different clustering approaches," Third Generation Partnership Project (3GPP), TSG RAN WG1 Meeting #96bis, Apr. 8-12, 2019, 6 pages, Xi'an, China.
Ericsson, "R1-1905169: On MAC-CE signaling impact for Rel-16 TCI indication framework," Third Generation Partnership Project (3GPP), TSG RAN WG1 Meeting #96bis, Apr. 8-12, 2019, 3 pages, Xi'an, China.
Ericsson, "R1-1905179: Additional evaluation results on different multi-TRP schemes for reliable PDSCH transmission in URLLC," Third Generation Partnership Project (3GPP), TSG RAN WG1 Meeting #96bis, Apr. 8-12, 2019, 8 pages, Xi'an, China.
Huawei, et al., "R1-1903541: Summary of AI: 7.2.8.2 Enhancements on Multi-TRP/Panel Transmission of Offline Discussion," Third Generation Partnership Project (3GPP), TSG RAN WG1 Meeting #96, Feb. 25-Mar. 1, 2019, 59 pages, Athens, Greece.
Huawei, "R1-1903610: Offline Discussion for Multi-TRP/Panel Transmission and General plan for RAN1 96bis," Third Generation Partnership Project (3GPP), TSG RAN WG1 Meeting #96, Feb. 25-Mar. 1, 2019, 4 pages, Athens, Greece.
Intel, "R1-1901275: On multi-TRP/multi-panel transmission," Third Generation Partnership Project (3GPP), TSG RAN WG1 Ad-Hoc Meeting 1901, Jan. 21-25, 2019, 12 pages, Taipei, Taiwan.
Nokia, "R1-1900691: Enhancements on Multi-TRP/Panel Transmission," Third Generation Partnership Project (3GPP), TSG RAN WG1 Ad-Hoc Meeting 1901, Jan. 21-25, 2019, 9 pages, Taipei, Taiwan.
NTT Docomo, et al., "R1-1813333: Enhancements on multi-TRP/panel transmission," Third Generation Partnership Project (3GPP), TSG RAN WG1 Meeting #95, Nov. 12-16, 2018, 20 pages, Spokane, USA.
Panasonic, "R1-1904190: On multi-TRP enhancements for NR MIMO in Rel. 16," Third Generation Partnership Project (3GPP), TSG RAN WG1 #96bis, Apr. 8-12, 2019, 13 pages, Xi'an, China.
Qualcomm Incorporated, "R1-1900905: Multi-TRP Enhancements," Third Generation Partnership Project (3GPP), TSG-RAN WG1 Meeting AH-1901, Jan. 21-25, 2019, 26 pages, Taipei, Taiwan.
Qualcomm Incorporated: "R1-1903043: Multi-TRP Enhancements," Third Generation Partnership Project (3GPP), TSG-RAN WG1 Meeting #96, Feb. 25-Mar. 1, 2019, 30 pages, Athens, Greece.
Vivo, "R1-1901702: Further Discussion on Multi-TRP Transmission," Third Generation Partnership Project (3GPP), TSG RAN1 #96, Feb. 25-Mar. 1, 2019, 14 pages, Athens, Greece.
ZTE, "R1-1812256: Enhancements on multi-TRP/Panel transmission," Third Generation Partnership Project (3GPP), TSG RAN WG1 Meeting #95, Nov. 12-16, 2018, 14 pages, Spokane, USA.
Examination Report for Indian Patent Application No. 202147048763, mailed May 6, 2022, 8 pages.

(56) References Cited

OTHER PUBLICATIONS

Notification of Reason for Refusal for Korean Patent Application No. 10-2021-7034327, mailed Mar. 7, 2022, 6 pages.
Office Action for Russian Patent Application No. 2021131265, mailed May 6, 2022, 11 pages.
International Search Report and Written Opinion for International Patent Application No. PCT/IB2020/053027, mailed Jun. 19, 2020, 17 pages.
Written Opinion for International Patent Application No. PCT/IB2020/053027, mailed Mar. 2, 2021, 4 pages.
International Preliminary Report on Patentability for International Patent Application No. PCT/IB2020/053027, mailed May 28, 2021, 23 pages.
Invitation to Pay Additional Fees and Partial Search for International Patent Application No. PCT/IB2020/054168, mailed Jul. 17, 2020, 15 pages.
International Search Report and Written Opinion for International Patent Application No. PCT/IB2020/054168, mailed Sep. 8, 2020, 20 pages.
Notice of Allowance for U.S. Appl. No. 17/600,000, mailed Jan. 31, 2022, 7 pages.
First Office Action for Chinese Patent Application No. 202080040078.X, mailed Aug. 26, 2023, 9 pages.
Request for the Submission of an Opinion for Korean Patent Application No. 10-2021-7034327, mailed Jun. 16, 2023, 1 pages.
Request for the Submission of an Opinion for Korean Patent Application No. 10-2023-7013762, mailed Jun. 16, 2023, 6 pages.
Examination Report for European Patent Application No. 20724590.3, mailed Jun. 6, 2023, 5 pages.
Author Unknown, "Technical Specification Group Radio Access Network; NR; Multiplexing and channel coding (Release 15)," Excerpt from Technical Specification 38.212, Version 15.5.0, Mar. 2019, 3GPP Organizational Partners, 10 pages.
Author Unknown, "Technical Specification Group Radio Access Network; NR; Physical layer procedures for data (Release 15)," Excerpt from Technical Specification 38.214, Version 15.5.0, Mar. 2019, 3GPP Organizational Partners, 5 pages.
Qualcomm Incorporated, "R1-1905026: Multi-TRP Enhancements," 3GPP TSG-RAN WG1 Meeting #96b, Apr. 8-12, 2019, Xi'an, China, 30 pages.
Intention to Grant for European Patent Application No. 20718781.6, mailed Sep. 12, 2022, 5 pages.
Notice of Reasons for Refusal for Japanese Patent Application No. 2021-565125, mailed Oct. 28, 2022, 8 pages.
Office Action for Egyptian Patent Application No. PCT1521/2021, received on Nov. 27, 2023, 3 pages (translation only).
Non-Final Office Action for U.S. Appl. No. 17/608,558, mailed Feb. 23, 2024, 25 pages.
Technical Examination Report for Brazilian Patent Application No. 112021019292-1, mailed Mar. 25, 2024, 10 pages.
Written Decision on Registration for Korean Patent Application No. 10-2024-7017552, mailed Aug. 29, 2024, 6 pages.

\* cited by examiner

*NR Physical Resource Grid*

*Front-loaded DM-RS for configuration type 1 and type 2. CDM groups indicated by shading.*

An example of a NR Rel-16 enhancement for PDSCH where multiple PDSCHs corresponding to different TCI states are received from multi-TRPs An example of NR Rel-16 spatially multiplexed PDSCHs from two TRPs where each PDSCH is associated with a different TCI state An example of NR Rel-16 frequency multiplexed PDSCHs from two TRPs where each PDSCH is associated with a different TCI state

*An example of NR Rel-16 slot-based time-multiplexed PDSCHs from two TRPs where each PDSCH is associated with a different TCI state*

An example of NR Rel-16 mini-slot-based time-multiplexed PDSCHs from two TRPs where each PDSCH is associated with a different TCI state

An example of SDM and FDM transmission with single vs. multiple RV for PDSCH transmission over two TRPs

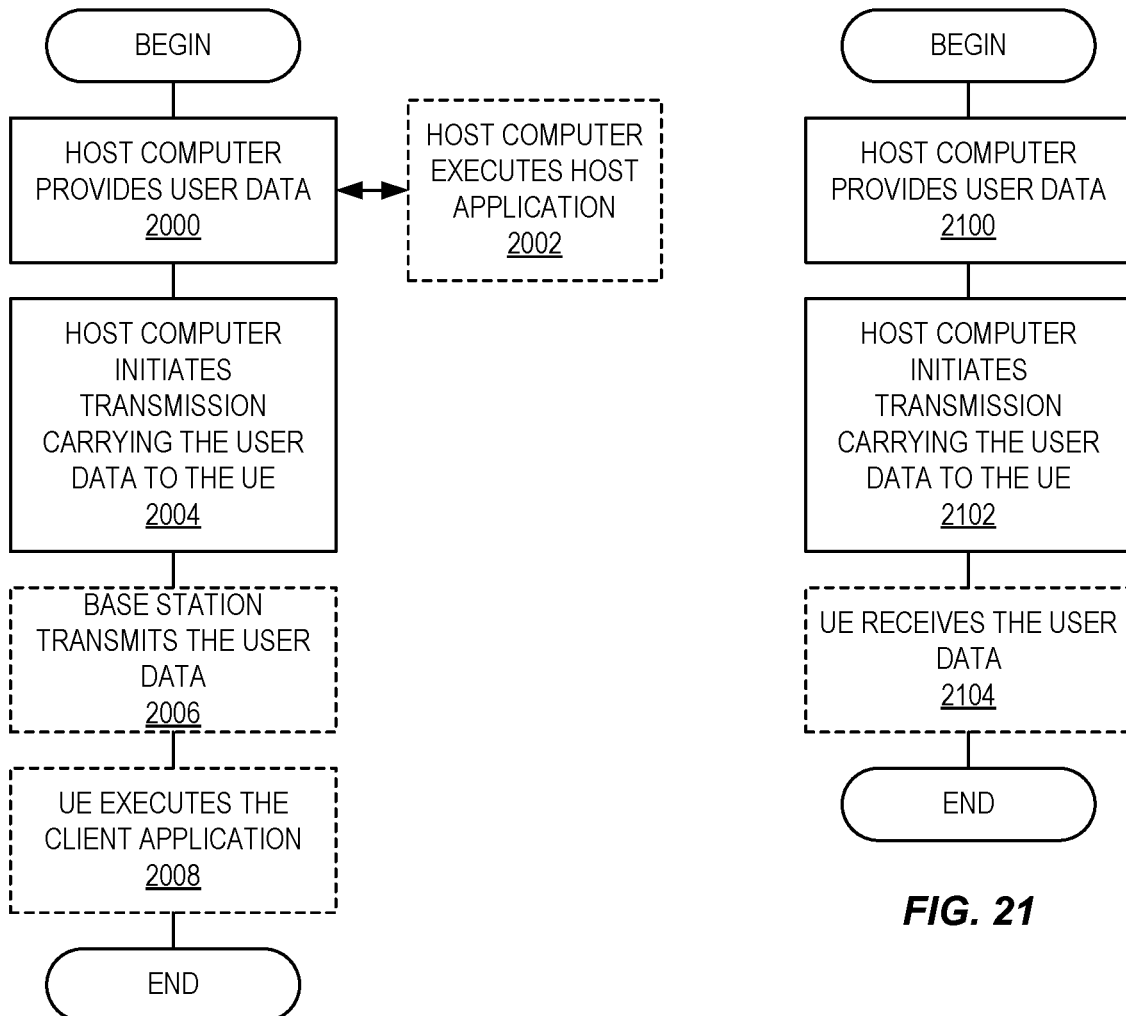

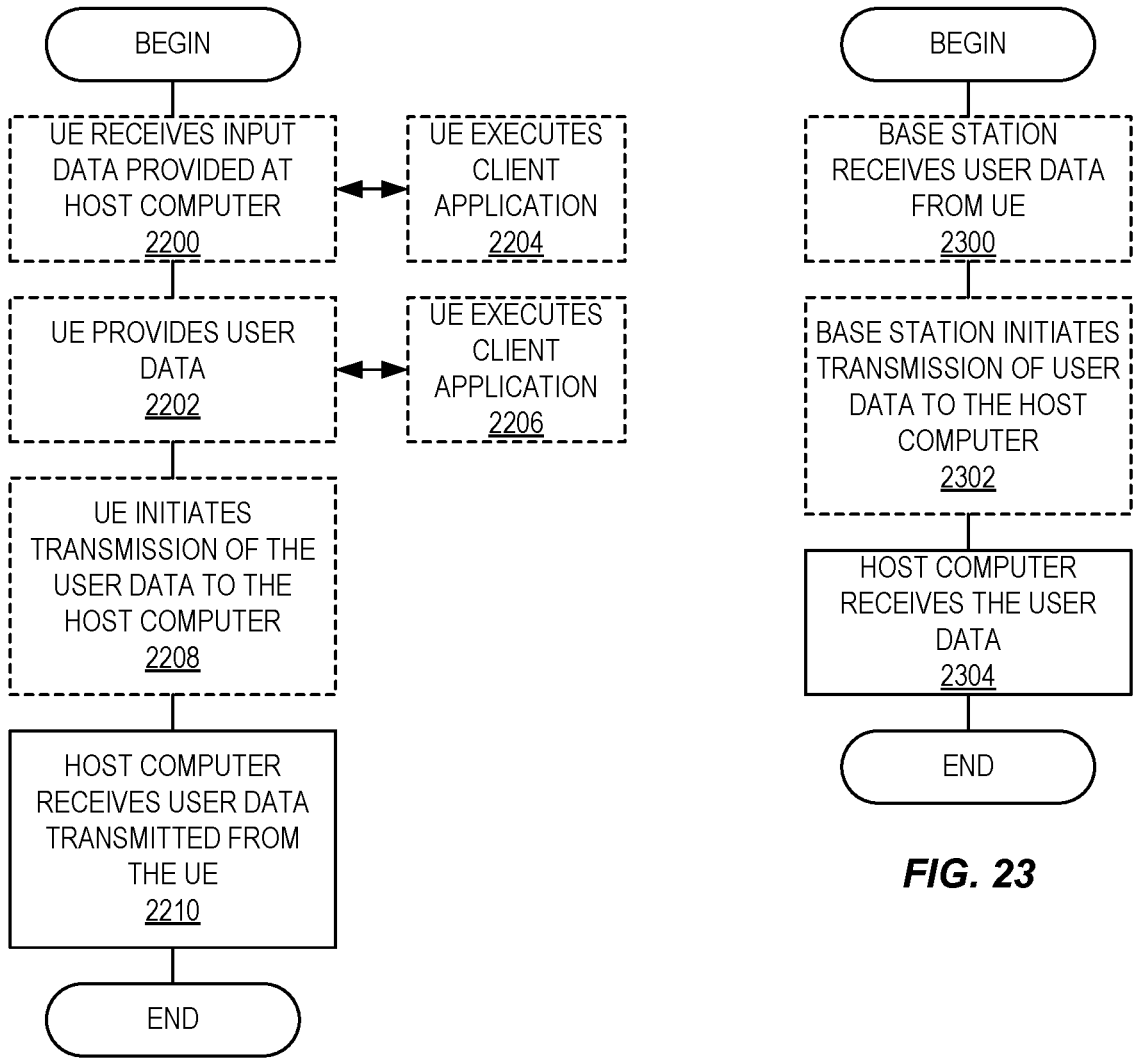

METHOD FOR DIFFERENTIATING MULTIPLE PHYSICAL DOWNLINK SHARED CHANNEL (PDSCH) TRANSMISSION SCHEMES

RELATED APPLICATIONS

This application is a continuation of U.S. patent application Ser. No. 17/600,000, filed Sep. 29, 2021, now U.S. Pat. No. 11,395,319, which is a 35 U.S.C. § 371 national phase filing of International Application No. PCT/IB2020/053027, filed Mar. 30, 2020, which claims the benefit of provisional patent application Ser. No. 62/826,392, filed Mar. 29, 2019, the disclosures of which are hereby incorporated herein by reference in their entireties.

TECHNICAL FIELD

The technology of the disclosure relates generally to receiving a data transmission in a physical downlink shared channel(s) (PDSCH(s)) based on a PDSCH transmission scheme(s).

BACKGROUND

Fifth Generation New Radio (5G-NR) is a new Radio Access Technology (RAT) widely regarded as the next generation of RAT beyond the current Third Generation (3G) and Fourth Generation (4G) RATs. A 5G-NR radio node, such as an infrastructure Base Station (BS) or a User Equipment (UE), can be configured to transmit a Radio Frequency (RF) signal(s) in a millimeter wave (mmWave) spectrum(s) that is typically higher than 6 GHz.

New Radio (NR)

The new 5G-NR supports a diverse set of use cases and a diverse set of deployment scenarios.

5G-NR uses Cyclic Prefix Orthogonal Frequency Division Multiplexing (CP-OFDM) in the downlink (i.e. from a network node, gNB, eNB, or BS to a UE) and both CP-OFDM and Discrete Fourier Transform Spread Orthogonal Frequency Division Multiplexing (DFT-spread OFDM or DFT-S-OFDM) in the uplink (i.e. from UE to gNB). In the time domain, NR downlink and uplink physical resources are organized into equally-sized subframes of 1 millisecond (ms) each. A subframe is further divided into multiple slots of equal duration.

The slot length depends on subcarrier spacing. For subcarrier spacing of $\Delta f$=15 kHz, there is only one slot per subframe. Each slot consists of 14 OFDM symbols, irrespective of the subcarrier spacing.

Typical data scheduling in NR is on a per slot basis. An example is shown in FIG. 1 where the first two symbols contain a Physical Downlink Control Channel (PDCCH) and the remaining 12 symbols contain a Physical Data Channel (PDCH), either a Physical Downlink Data Channel (PDSCH) or Physical Uplink Data Channel (PUSCH).

Different subcarrier spacing values are supported in NR. The supported subcarrier spacing values (also referred to as different numerologies) are given by $\Delta f=(15\times 2a)$ kHz where a is a non-negative integer. $\Delta f$=15 kHz is the basic subcarrier spacing that is also used in Long Term Evolution (LTE). The slot durations at different subcarrier spacings are shown in Table 1.

TABLE 1

Slot length at different numerologies.

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

In the frequency domain physical resource definition, a system bandwidth is divided into Resource Blocks (RBs), each corresponding to 12 contiguous subcarriers. The Common RBs (CRB) are numbered starting with 0 from one end of the system bandwidth. The UE is configured with one or up to four Bandwidth Parts (BWPs) which may be a subset of the RBs supported on a carrier. Hence, a BWP may start at a CRB larger than zero. All configured BWPs have a common reference, the CRB 0. Hence, a UE can be configured as a narrow BWP (e.g. 10 MHz) and a wide BWP (e.g. 100 MHz), but only one BWP can be active for the UE at a given point in time. The physical RBs (PRB) are numbered from 0 to N−1 within a BWP (but the $0^{th}$ PRB may thus be the $K^{th}$ CRB where K>0).

The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about UEs to which data is to be transmitted and RBs in the current downlink slot on which the data is transmitted. PDCCH is typically transmitted in the first one or two OFDM symbols in each slot in NR. The UE data are carried on PDSCH. A UE first detects and decodes PDCCH and if the decoding is successful, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based on the decoded control information in the uplink grant such as modulation order, coding rate, uplink resource allocation, etc.

Quasi Co-Located (QCL) and Transmission Configuration Indication (TCI) States Several signals can be transmitted from the same base station antenna from different antenna ports. These signals can have the same large-scale properties, for instance in terms of Doppler shift/spread, average delay spread, or average delay. These antenna ports are then said to be Quasi Co-Located (QCL).

The network can then signal to the UE that two antenna ports are QCL. If the UE knows that two antenna ports are QCL with respect to a certain parameter (e.g. Doppler spread), the UE can estimate that parameter based on one of the antenna ports and use that estimate when receiving the other antenna port. Typically, the first antenna port is represented by a measurement reference signal such as Channel State Information Reference Signal (CSI-RS) (known as source reference signal (RS)) and the second antenna port is a Demodulation Reference Signal (DMRS) (known as target RS).

For instance, if antenna ports A and B are QCL with respect to average delay, the UE can estimate the average delay from the signal received from antenna port A (known as the source RS) and assume that the signal received from antenna port B (target RS) has the same average delay. This is useful for demodulation since the UE can know beforehand the properties of the channel when trying to measure the channel utilizing the DMRS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE, so that it can estimate all the relevant large scale parameters.

Typically this is achieved by configuring the UE with a CSI-RS for tracking (TRS) for time/frequency offset estimation. To be able to use any QCL reference, the UE would have to receive it with a sufficiently good Signal-to-Interference-Plus-Noise Ratio (SINR). In many cases, this means that the TRS has to be transmitted in a suitable beam to a certain UE.

To introduce dynamics in beam and Transmission/Reception Point (TRP) selection, the UE can be configured through Radio Resource Control (RRC) signaling with N TCI states, where N is up to 128 in frequency range 2 (FR2) and up to 8 in frequency range 1 (FR1), depending on UE capability.

Each TCI state contains QCL information, i.e. one or two source downlink RSs, each source RS associated with a QCL type. For example, a TCI state contains a pair of reference signals, each associated with a QCL type, e.g., two different CSI-RSs {CSI-RS1, CSI-RS2} configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e. the RX beam to use) from CSI-RS2. In the case type D (spatial information) is not applicable, such as low-band or mid-band operation, then a TCI state contains only a single source RS.

Each of the N states in the list of TCI states can be interpreted as a list of N possible beams transmitted from the network or a list of N possible TRPs used by the network to communicate with the UE.

A first list of available TCI states is configured for PDSCH, and a second list for PDCCH contains pointers, known as TCI State IDs, to a subset of the TCI states configured for PDSCH. The network then activates one TCI state for PDCCH (i.e. provides a TCI for PDCCH) and up to M active TCI states for PDSCH. The number M of active TCI states the UE can support is a UE capability but the maximum in NR Rel-15 is 8.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with four active TCI states (from a total list of s64 configured TCI states). Hence, 60 TCI states are inactive and the UE need not be prepared to have large scale parameters estimated for those. But the UE continuously tracks and updates the large-scale parameters for the 4 active TCI states by measurements and analysis of the source RSs indicated by each TCI state.

In NR Rel-15, when scheduling a PDSCH to a UE, the DCI contains a pointer to one active TCI. The UE then knows which large-scale parameter estimate to use when performing PDSCH DMRS channel estimation and thus PDSCH demodulation.

DMRS

DMRS is used for coherent demodulation of physical layer data channels, PDSCH (downlink) and PUSCH (uplink), as well as PDCCH. The DMRS is confined to resource blocks carrying the associated physical layer channel and is mapped on allocated resource elements of the OFDM time-frequency grid such that the receiver can efficiently handle time/frequency-selective fading radio channels.

The mapping of DMRS to resource elements is configurable in both frequency and time domain, with two mapping types in the frequency domain (configuration type 1 or type 2) and two mapping types in the time domain (mapping type A or type B) defining the symbol position of the first DMRS within a transmission interval. The DMRS mapping in time domain can further be single-symbol based or double-symbol based where the latter means that DMRS is mapped in pairs of two adjacent symbols. Furthermore, a UE can be configured with one, two, three, or four single-symbol DMRS and one or two double-symbol DMRS. In scenarios with low Doppler, it may be sufficient to configure front-loaded DMRS only, i.e. one single-symbol DMRS or one double-symbol DMRS, whereas in scenarios with high Doppler additional DMRS will be required.

FIG. 3 shows the mapping of front-loaded DMRS for configuration type 1 and type 2 with single-symbol and double-symbol DMRS and for the mapping of type A with first DMRS in a third symbol of a transmission interval of 14 symbols. We observe from this figure that type 1 and type 2 differ with respect to both the mapping structure and the number of supported DMRS Code Division Multiplexing (CDM) groups where type 1 supports 2 CDM groups and Type 2 supports 3 CDM groups.

The mapping structure of type 1 is sometimes referred to as a 2-comb structure with two CDM groups defined, in frequency domain, by the set of subcarriers {0, 2, 4, . . . } and {1,3,5, . . . }. The comb mapping structure is a prerequisite for transmissions requiring low PAPR/CM and is thus used in conjunction with DFT-S-OFDM, whereas in CP-OFDM both type 1 and type 2 mapping are supported.

A DMRS antenna port is mapped to the resource elements within one CDM group only. For single-symbol DMRS, two antenna ports can be mapped to each CDM group whereas for double-symbol DMRS four antenna ports can be mapped to each CDM group. Hence, the maximum number of DMRS ports for type 1 is either four or eight and for type 2 is either six or twelve. An Orthogonal Cover Code (OCC) of length 2 ([+1, +1], [+1, −1]) is used to separate antenna ports mapped on same resource elements within a CDM group. The OCC is applied in a frequency domain as well as in a time domain when a double-symbol DMRS is configured.

In NR Rel-15, the mapping of a PDSCH DMRS sequence r(m), m=0, 1, . . . on antenna port p; and subcarrier k in OFDM symbol l for the numerology index y is specified in TS38.211 as $$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $$r_\lambda^{(p_j)}(2n+k') = w_f(k') w_t(l') r(2n+k')$$

represents the reference signal mapped on port p; in CDM group A after applying OCC in frequency domain, $w_f(k')$, and time domain, $w_t(l')$. Table 2 and Table 3 show the PDSCH DMRS mapping parameters for configuration type 1 and type 2, respectively.

TABLE 2

PDSCH DMRS mapping parameters for configuration type 1.

| p | CDM group λ | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 3

PDSCH DMRS mapping parameters for configuration type 2.

| p | CDM group λ | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Antenna Port Indication Tables

The DCI contains a bit field that selects which antenna ports and the number of antenna ports (i.e. the number of data layers) that are scheduled. For example, if port 1000 is indicated, then the PDSCH is a single layer transmission and the UE will use the DMRS defined by port 1000 to demodulate the PDSCH.

An example is shown in Table 4 on the next page for DMRS Type 1 and with a single front loaded DMRS symbol (maxLength=1). The DCI indicates a value and the number of DMRS ports are given. The value also indicates the number of CDM groups without data, which means that if 1 is indicated, the other CDM group does contain data for the UE (PDSCH case). If the value is 2, both CDM groups may contain DMRS ports and no data is mapped to the OFDM symbol containing the DMRS.

For DMRS Type 1, ports 1000, 1001, 1004, and 1005 are in CDM group λ=0 and ports 1002, 1003, 1006, and 1007 are in CDM group λ=1. This is also indicated in Table 2.

Table 5 shows the corresponding table for DMRS Type 2. For DMRS Type 2 ports 1000, 1001, 1006, and 1007 are in CDM group λ=0 and ports 1002, 1003, 1008, and 1009 are in CDM group λ=1. Ports 1004, 1005, 1010, and 1011 are in CDM group λ=2. This is also indicated in Table 3.

Other tables for other DMRS configurations can be found in TS 38.212.

TABLE 4

Antenna port(s) (1000 + DMRS port),
dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 5

Antenna port(s) (1000 + DMRS port),
dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group (s) without data | DMRS port(s) | Value | Number of DMRS CDM group (s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |

TABLE 5-continued

Antenna port(s) (1000 + DMRS port),
dmrs-Type = 2, maxLength = 1

| One codeword: Codeword 0 enabled, Codeword 1 disabled | | Two codewords: Codeword 0 enabled, Codeword 1 enabled | |
|---|---|---|---|
| Value | Number of DMRS CDM group (s) without data | DMRS port(s) | Value | Number of DMRS CDM group (s) without data | DMRS port(s) |

| Value | Number of DMRS CDM group(s) without data | DMRS port(s) |
|---|---|---|
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24-31 | Reserved | Reserved |

QCL Relation to DMRS CDM Groups

In NR specification TS 38.211, there is a restriction stating:
The UE may assume that the PDSCH DMRS within the same CDM group are quasi co-located with respect to Doppler shift, Doppler spread, average delay, delay spread, and spatial Rx.

In cases where a UE is not scheduled with all DMRS ports within a CDM group, there may be another UE simultaneously scheduled, using the remaining ports of that CDM group. The UE can then estimate the channel for that other UE (thus an interfering signal) in order to perform coherent interference suppression. Hence, this is useful in Multi-User Multiple Input Multiple Output (MU-MIMO) scheduling and UE interference suppression.

Ultra-Reliable and Low Latency (URLLC) NR

In NR Rel-16, there are ongoing specification enhancements for Ultra-Reliable and Low-Latency Communication (URLLC) with packet error rates down to $10^{-5}$. For these services, an alternative Modulation and Coding Scheme (MCS) table can be configured to be used for PDSCH or PUSCH scheduling, which gives more robust reception of the data payload.

NR Rel-16 Enhancements for PDSCH with Multi-TRPs

In NR Rel-16, there are ongoing discussions on the support of PDSCH with multi-TRP. There are two variants that will be supported, where a single PDCCH or multiple (i.e. two) PDCCHs are used to schedule multi-TRPs.

One variant that is being considered is a single PDCCH scheduling one or multiple PDSCHs from different TRPs. The single PDCCH is received from one of the TRPs. FIG. 4 shows an example where a DCI received by the UE in PDCCH from TRP1 schedules two PDSCHs. The first PDSCH (PDSCH1) is received from TRP1 and the second PDSCH (PDSCH2) is received from TRP2. Alternatively, the single PDCCH schedules a single PDSCH where PDSCH layers are grouped into two groups and where layer group 1 is received from TRP1 and layer group 2 is received from TRP2. In such cases, each PDSCH or layer group that is transmitted from a different TRP has a different TCI state associated with it. In the example of FIG. 4, PDSCH1 is associated with TCI State p, and PDSCH 2 is associated with TCI state q.

In the RAN1 AdHoc meeting in January 2019, the following was agreed:
Agreement
  TCI indication framework shall be enhanced in Rel-16 at least for eMBB:
    Each TCI code point in a DCI can correspond to one or two TCI states
      When two TCI states are activated within a TCI code point, each TCI state corresponds to one CDM group, at least for DMRS type 1
      FFS design for DMRS type 2
      FFS: TCI field in DCI, and associated MAC-CE signaling impact According to the above agreement, each codepoint in the DCI TCI field can be mapped to either one or two TCI states. This can be interpreted as follows:
  A DCI in PDCCH schedules 1 or 2 PDSCHs (or 1 or 2 layer groups if a single PDSCH) where each PDSCH or layer group is associated with a different TCI state; the codepoint of the TCI field in DCI indicates the one or two TCI states associated with the one or two PDSCHs or layer groups scheduled.
In this case, the two DMRS of the two PDSCHs or the two layer groups respectively are not mapped to the same DMRS CDM group.

For multi-TRP based PDSCH transmission, different schemes are being considered in NR Rel-16.

One of the schemes being considered involves spatially multiplexing the different PDSCHs transmitted from multiple TRPs in the same Physical Resource Blocks (PRBs). An example is shown in FIG. 5. In this example, a PDCCH indicates two different PDSCHs where PDSCH 1 associated with TCI state p is transmitted from TRP 1 and PDSCH 2 associated with TCI state q is transmitted from TRP2. Since PDSCH 1 and PDSCH 2 are spatially multiplexed in the same PRBs and since TRPs 1 and 2 are spatially separated, the DMRSs corresponding to these two PDSCHs are transmitted using different DMRS CDM groups. In the example of FIG. 5, the DMRS for PDSCH1 belongs to CDM group 0 while the DMRS for PDSCH2 belongs to CDM group 1. In NR Rel-16, the scheme of spatially-multiplexed PDSCHs associated with different TCI states is being considered for both Enhanced Mobile Broadband (eMBB) and URLLC.

A second scheme being considered involves frequency multiplexing the different PDSCHs transmitted from multiple TRPs in different PRBs. An example is shown in FIG. 6. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are frequency multiplexed, the DMRS corresponding to the two PDSCHs are transmitted in non-overlapping resources (i.e., different PRBs). Hence, the DMRSs for the two PDSCHs can use the same CDM group in this case, and even the same antenna port in all non-overlapping resources (or a different CDM group for whatever reason). In the example of FIG. 6, DMRS for PDSCH 1 is transmitted using CDM group 0 in PRB i, while DMRS for PDSCH 2 is transmitted using CDM group 0 in PRB j. NR Rel-16, the scheme of frequency-multiplexed PDSCHs associated with different TCI states, is being considered for URLLC.

A third scheme being considered involves slot-based time multiplexing the different PDSCHs transmitted from multiple TRPs in different PRBs. An example is shown in FIG. 7. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different slots, the DMRS corresponding to the two PDSCHs are transmitted in non-overlapping resources (i.e., different slots). Hence, the DMRSs for the two PDSCHs can use the same or different CDM group or even exactly the same antenna ports in each of the slots. In the example of FIG. 7, DMRS for PDSCH 1 is transmitted using CDM group 0 in slot n, while DMRS for PDSCH 2 is transmitted using CDM group 0 in slot n+1. NR Rel-16, the scheme of slot-based time-multiplexed PDSCHs associated with different TCI states, is being considered for URLLC.

A fourth scheme being considered involves mini-slot-based time multiplexing (also known as PDSCH Type B scheduling in NR specifications) the different PDSCHs transmitted from multiple TRPs in different PRBs. Note that NR currently allows mini-slot transmissions in the downlink, where a mini-slot downlink transmission may include 2, 4, or 7 OFDM symbols with normal cyclic prefix. An example of the fourth scheme is shown in FIG. 8. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different mini-slots, the DMRSs corresponding to the two PDSCHs are transmitted in non-overlapping resources (i.e., different mini-slots). Hence, the DMRSs for the two PDSCHs can use the same or different CDM groups or even the same antenna ports in each mini-slot. In the example of FIG. 8, DMRS for PDSCH 1 is transmitted using CDM group 0 in mini-slot n, while DMRS for PDSCH 2 is transmitted using CDM group 0 in mini-slot n+1. NR Rel-16, the scheme of mini-slot-based time-multiplexed PDSCHs associated with different TCI states is being considered for URLLC.

In both Spatial Division Multiplexing (SDM) and Frequency Division Multiplexing (FDM) based multi-TRP schemes, there are two sub-types, depending on whether there is a single Codeword (CW) with a single Redundancy Version (RV) or multiple CWs each with the same or different RVs. We refer them as SDM single RV, SDM multi-RV, FDM single RV and FDM multi-RV. They are illustrated in FIG. 9, where data of a Transport Block (TB) is encoded, modulated and mapped to two TRPs. In FIG. 9, a single CW with a single RV is generated. In the case of SDM, the CW is mapped to two MIMO layers, one for each TRP. The corresponding symbols for the $1^{st}$ layer are sent over TRP1 and symbols corresponding to the $2^{nd}$ layer are sent over TRP2. Two TCI states, one for each TRP, are signaled in DCI together with DMRS ports 0 and 2 information. Note that DMRS ports 0 and 2 belong to two CDM groups. In the case of FDM, the CW is mapped to a single MIMO layer and symbols associated with half of the scheduled RBs are sent over TRP1 and symbols associated with the other half of RBs are sent over TRP2. In this case, two TCI states, one for each TRP, are signaled in DCI together with a single DRMS port 0. Similar to data, DMRS port 0 symbols in half of the RBs are sent over TRP1 and symbols in the other half of RBs are sent over TRP2.

In FIG. 9, two CWs are generated, each with a different RV and for one TRP. In the case of SDM, one CW is sent over TRP1 and the other over TRP2. Two TCI states are signaled in DCI together with DMRS ports 0 and 2 information. In the case of FDM, one CW is mapped to half of the scheduled RBs and sent over TRP1 and the other CW is mapped to the other half of RBs and sent over TRP2. At the UE side, the two CWs are demodulated and decoded separately, and the soft bits are combined to obtain the TB estimation.

SUMMARY

Embodiments disclosed herein include a method for differentiating multiple Physical Downlink Shared Channel (PDSCH) transmission schemes. In a non-limiting example, the PDSCH transmission schemes include a spatial multiplexing transmission scheme, a frequency multiplexing transmission scheme, a slot-based time multiplexing transmission scheme, and a mini-slot-based time multiplexing transmission scheme. In examples discussed herein, a User Equipment (UE) can be configured to differentiate the PDSCH transmission schemes based on information indicated in Downlink Control Information (DCI) for scheduling a PDSCH transmission(s), information signaled to the UE via a higher layer configuration, and/or capability signaling indicated from the UE to a network. By differentiating the PDSCH transmission schemes, the UE can efficiently receive the PDSCH transmission(s) from multiple Transmission/Reception Points (TRPs).

In one embodiment, a method performed by a UE for differentiating a plurality of PDSCH transmission schemes in a cellular communications system is provided. The method includes receiving control signaling from a network for scheduling one or more PDSCH transmissions. The one or more PDSCH transmissions comprise a first transmission associated with a first Transmission Configuration Indication (TCI) state and a second transmission associated with a second TCI state. The method also includes determining one or more PDSCH transmission schemes among a plurality of PDSCH transmission schemes for receiving the one or more PDSCH transmissions from the network based on one or more of: information indicated in DCI scheduling the one or more PDSCH transmissions, information signaled to the UE via a higher layer configuration, and capability signaling indicated from the UE to the network. The method also includes receiving the one or more PDSCH transmissions in accordance with the determined one or more PDSCH transmission schemes.

In another embodiment, a wireless device is provided. The wireless device includes processing circuitry. The processing circuitry is configured to receive control signaling from a network for scheduling one or more PDSCH transmissions. The one or more PDSCH transmissions comprise a first transmission associated with a first TCI state and a second transmission associated with a second TCI state. The processing circuitry is also configured to determine one or more PDSCH transmission schemes among a plurality of PDSCH transmission schemes for receiving the one or more PDSCH transmissions from the network based on one or more of: information indicated in DCI scheduling the one or more PDSCH transmissions, information signaled to the UE via a higher layer configuration, and capability signaling indicated from the UE to the network. The processing circuitry is also configured to receive the one or more PDSCH transmissions in accordance with the determined one or more PDSCH transmission schemes. The wireless device also includes power supply circuitry configured to supply power to the wireless device.

In another embodiment, a method performed by a base station is provided. The method includes providing, to a UE, an indication of one or more PDSCH schemes among a plurality of PDSCH transmission schemes to be expected by the UE for receiving one or more PDSCH transmissions.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 20 is a flowchart illustrating a method implemented in a communication system;

FIG. 21 is a flowchart illustrating a method implemented in a communication system;

FIG. 22 is a flowchart illustrating a method implemented in a communication system; and FIG. 23 is a flowchart illustrating a method implemented in a communication system.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 10:
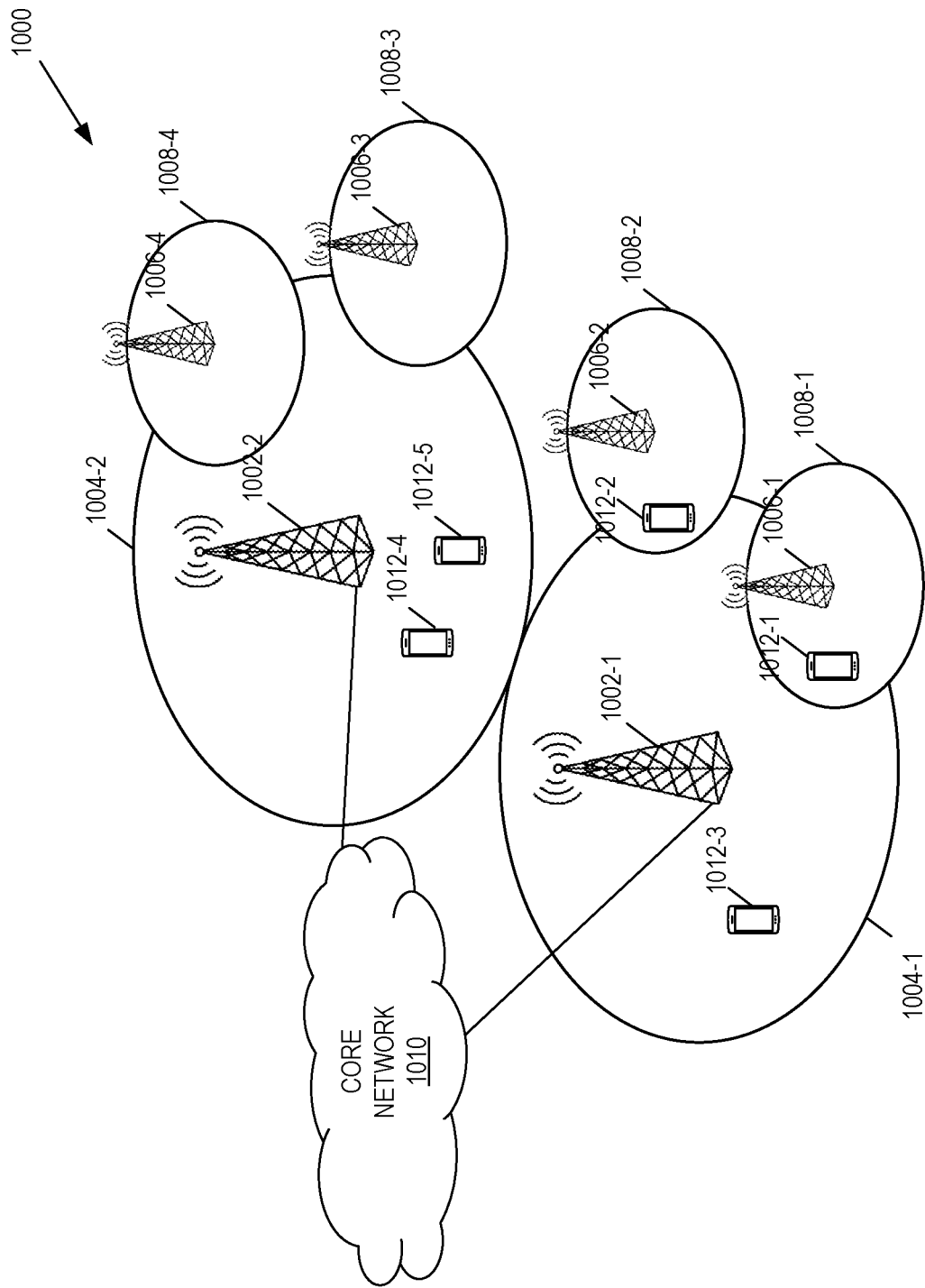
FIG. 10 illustrates one example of a cellular communications network in accordance with some embodiments of the present disclosure.

FIG. 10 illustrates one example of a cellular communications system 1000 in which embodiments of the present disclosure may be implemented. In the embodiments described herein, the cellular communications system 1000 is a 5G system (5GS) including a 5G NR Radio Access Network (RAN) that includes base stations 1002-1 and 1002-2, which in 5G NR are referred to as gNBs, controlling corresponding macro cells 1004-1 and 1004-2. The base stations 1002-1 and 1002-2 are generally referred to herein collectively as base stations 1002 and individually as base station 1002. Likewise, the macro cells 1004-1 and 1004-2 are generally referred to herein collectively as macro cells 1004 and individually as macro cell 1004. The cellular communications network 1000 may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The base stations 1002 (and optionally the low power nodes 1006) are connected to a core network 1010.

The base stations 1002 and the low power nodes 1006 provide service to wireless devices 1012-1 through 1012-5 in the corresponding cells 1004 and 1008. The wireless devices 1012-1 through 1012-5 are generally referred to herein collectively as wireless devices 1012 and individually as wireless device 1012. The wireless devices 1012 are also sometimes referred to herein as UEs.

Now, a description of a number of example embodiments is provided. Note that these embodiments may be used separately or in combination. Further, while the example embodiments are described with respect to NR, the present disclosure is not limited thereto. The embodiments disclosed herein may be utilized in any wireless communication system that, e.g., utilizes multi-TRP transmissions.

There currently exist certain challenges with respect to Physical Downlink Shared Channel (PDSCH) transmission from multiple TRPs in a 5G NR network. Although 5G NR Release 16 (Rel-16) defines a number of PDSCH multiplexing schemes, such as spatial multiplexing, frequency multiplexing, slot-based time multiplexing, and mini-slot based time multiplexing transmission schemes, one problem remains as to how a UE differentiates the different PDSCH transmission schemes when it receives a transmission from multiple TRPs in a network (e.g., receiving from multiple TRPs located in a base station(s)).

Certain aspects of the present disclosure and their embodiments may provide solutions to the aforementioned or other challenges. In general, embodiments of a method performed by (i.e., executed by) a UE for differentiating between two or more (e.g., PDSCH) transmissions schemes are disclosed. In some embodiments, the UE receives a multi-TRP (e.g., PDSCH) transmission from two or more TRPs, where at least some of the two or more TRPs are configured with different TCI states. In some embodiments, the UE differentiates between the two or more (e.g., PDSCH) transmission schemes based on one or more of: information indicated in downlink control information scheduling the transmission, information signaled to the UE via a higher layer configuration, and capability signaling indicated from the UE to a respective base station (e.g., gNB). In other words, the UE is able to determine one of the two or more transmission schemes utilized for the multi-TRP transmission based on information indicated in downlink control information scheduling the transmission, information signaled to the UE via the higher layer configuration, and/or capability signaling indicated from the UE to a respective base station (e.g., gNB).

Certain embodiments may provide one or more of the following technical advantage(s). With the proposed solutions, a UE can efficiently differentiate between the different NR Rel-16 PDSCH transmission schemes when such a transmission is received from multiple TRPs.

As such, it may be desirable to define a method to enable the UE to efficiently differentiate between the two or more PDSCH transmission schemes. In examples discussed herein, a UE can be configured to differentiate between the two or more PDSCH transmission schemes based on information indicated in Downlink Control Information (DCI) for scheduling a PDSCH transmission(s), information signaled to the UE via the higher layer configuration, and/or capability signaling indicated from the UE to a network. By differentiating the PDSCH transmission schemes, the UE can efficiently receive the PDSCH transmission(s) from multiple TRPs in the network.

PDSCH Transmission Scheme Differentiation Based on Dynamic Information Received in DCI and/or Other Higher Layer Configured Parameters In this embodiment, a UE can differentiate the PDSCH transmission schemes based on information indicated in DCI (which is carried in PDCCH). In some variants of this embodiment, other information, which is higher layer configured (for example, RRC configured), may additionally be used in conjunction with the information indicated in DCI by the UE to differentiate the PDSCH transmission schemes.

As discussed below, different criteria for differentiating the PDSCH schemes are discussed. Note that when the TCI field in DCI indicates one TCI state, the UE is to assume PDSCH transmission associated with a single TCI state (i.e., PDSCH transmission from a single TRP). Hence, the discussion below focuses on cases when the DCI TCI field indicates more than one TCI state.

On exemplary aspect of the embodiment is related to differentiating a spatially multiplexed PDSCH transmission scheme. The Spatial Division Multiplexing (SDM) scheme involves the different PDSCHs being transmitted from multiple TRPs with different TCI states in the same Physical Resource Blocks (PRBs). Since TRPs 1 and 2 are likely spatially separated, the DMRSs corresponding to these two PDSCHs are transmitted using different DMRS CDM groups. In contrast, the Frequency Division Multiplexed (FDM) and Time Division Multiplexed (TDM) (both "slot-based time division multiplexed" and "mini-slot based time division multiplexed") PDSCH transmission schemes use non-overlapping resources in different TRPs. Hence, for the FDM and TDM PDSCH transmission schemes, the DMRSs corresponding to the two PDSCHs can be transmitted using the same DMRS CDM group, or even the same DMRS antenna ports. In this embodiment, a rule is defined that for FDM and TDM PDSCH transmission schemes, the UE expects DMRSs corresponding to the two PDSCHs to be transmitted using the same DMRS CDM group; for a spatially multiplexed PDSCH transmission scheme, the UE expects DMRSs corresponding to the two PDSCHs to be transmitted using different DMRS CDM groups. The UE can then differentiate the spatially multiplexed PDSCH transmission scheme from the other PDSCH transmission schemes as follows:

If the DCI TCI field indicates more than one TCI state (e.g., two TCI states), and the DCI Antenna ports field indicates DMRS ports belonging to more than one DMRS CDM group, then the UE assumes that (e.g., determines that) the PDSCH transmissions with the associated TCI states indicated in the DCI TCI field are spatially multiplexed. Additionally, the UE may assume that (e.g., determine that) the layers corresponding to a first DMRS CDM group are associated with a first indicated TCI state and that the layers corresponding to a second DMRS CDM group are associated with a second indicated TCI state.

Else, if the DCI TCI field indicates more than one TCI state (e.g., two TCI states), and the DCI Antenna ports field indicates DMRS ports belonging to one DMRS CDM group, then the UE assumes that (e.g., determines that) the PDSCH transmissions with the associated TCI states indicated in the DCI TCI field are not spatially multiplexed (i.e., the PDSCH transmissions are either frequency multiplexed or time multiplexed depending on other differentiation criterion discussed below).

Another exemplary aspect of the embodiment is related to differentiating a slot-based PDSCH transmission scheme. In NR Rel-15, it is possible to schedule a PDSCH with time repetition by configuring a UE with the RRC parameter PDSCH-AggregationFactor. In this case, the PDSCH is scheduled but transmitted in N adjacent slots, where N is the number of repetitions (i.e. the aggregation factor) as determined by the configured RRC parameter. This functionality can be extended in NR Rel-16 to realize the slot-based time-multiplexing of PDSCHs from two TRPs. Consider an example where a UE is configured with a PDSCH-AggregationFactor of value of 2, and the DCI TCI field indicates two TCI states. In this example, the PDSCH from the first TRP (corresponding to the first indicated TCI state) is transmitted in slot n and the PDSCH from the second TRP (corresponding to the second indicated TCI state) is transmitted in slot n+1. Hence, the configuration of PDSCH-AggregationFactor along with the indication of more than one TCI state in DCI TCI field can be used to differentiate slot-based time multiplexed PDSCH transmission from other schemes as follows:

If the DCI TCI field indicates more than one TCI state (e.g., two TCI states), the DCI Antenna ports field indicates DMRS ports belonging to one DMRS CDM group, and the UE is configured with RRC parameters PDSCH-AggregationFactor with a value larger than 1, then the UE assumes that (e.g., determines that) the PDSCH transmission with the associated TCI states indicated in the DCI TCI field are slot-based time multiplexed.

Else if the DCI TCI field indicates more than one TCI state (e.g., two TCI states), the DCI Antenna ports field indicates DMRS ports belonging to one DMRS CDM group, and the UE is not configured with RRC parameters PDSCH-AggregationFactor, then the UE assumes that (e.g., determines that) the PDSCH transmissions with the associated TCI states indicated in the DCI TCI field are not slot-based time multiplexed (i.e., the PDSCH transmissions are either FDM or mini-slot based time multiplexed depending on other differentiation criterion discussed below).

Another exemplary aspect of the embodiment is related to differentiating a mini slot-based PDSCH transmission scheme. In NR Rel-15, the Time Domain Resource Allocation (TDRA) information indicated in DCI for a PDSCH transmission in a slot includes information such that the UE can determine the slot that the PDSCH is expected to be received (denoted as K0 in NR specifications), the starting symbol in the slot for PDSCH reception and the length or duration in OFDM symbols of PDSCH reception (referred to as SLIV).

The UE is also provided with the PDSCH mapping type, which is used to determine the DMRS positions. In NR, there are TDRA tables specified consisting of different combinations of K0, SLIV, etc. The UE can be signaled in DCI with an index to a row in the table that provides information on K0 and SLIV to be used for PDSCH reception. This functionality can be extended in NR Rel-16 to realize the mini slot-based time-multiplexing of PDSCHs from two TRPs by associating additional parameters to each row of the TDRA tables. For example, the SLIV value can be extended to comprise a variable length list of SLIV values. If the TDRA row value indicated in DCI indicates multiple start times (or in addition multiple lengths) and the DCI TCI field indicates two TCI states, then the UE assumes that (e.g., determines that) there are two different PDSCHs associated with the two TCI states in the two mini-slots. Hence, the indication of multiple start times in the TDRA row value indicated in DCI along with the indication of more than one TCI state in the DCI TCI field can be used to differentiate mini slot-based time multiplexed PDSCH transmission from other schemes as follows:

If the DCI TCI field indicates more than one TCI state (e.g., two TCI states), the DCI Antenna ports field indicates DMRS ports belonging to one DMRS CDM group, the UE is not configured with RRC parameters PDSCH-AggregationFactor, and the TDRA row value indicated in DCI indicates multiple start times (or in addition multiple lengths), then the UE assumes that (e.g., determines that) the PDSCH transmission with the associated TCI states indicated in the DCI TCI field are mini-slot-based time multiplexed.

Else if the DCI TCI field indicates more than one TCI state (e.g., two TCI states), the DCI Antenna ports field indicates DMRS ports belonging to one DMRS CDM group, the UE is not configured with RRC parameters PDSCH-AggregationFactor, and the SLIV row value indicated in DCI indicates a single start time and length, then the UE assumes that (e.g., determines that) the PDSCH transmission with the associated TCI states indicated in the DCI TCI field are not mini-slot-based time multiplexed. (i.e., the PDSCH transmissions are likely frequency multiplexed).

In an alternative embodiment, the PDSCH is scheduled according to the TDRA table to indicate a start and end symbol in the slot, but a time domain PDSCH-SplitFactor is introduced to divide the PDSCH duration into multiple PDSCH sub-durations. For example, a PDSCH of length 8 is split into two parts (PDSCH-SplitFactor=2) each of length 2, and DMRS ports are assigned to each sub-duration from each CDM group respectively. Each sub-duration is also assigned an individual TCI state; so, when UE receives the PDSCH of the sub-duration, it uses the DMRS and the TCI state for that sub-duration.

Figure 11:
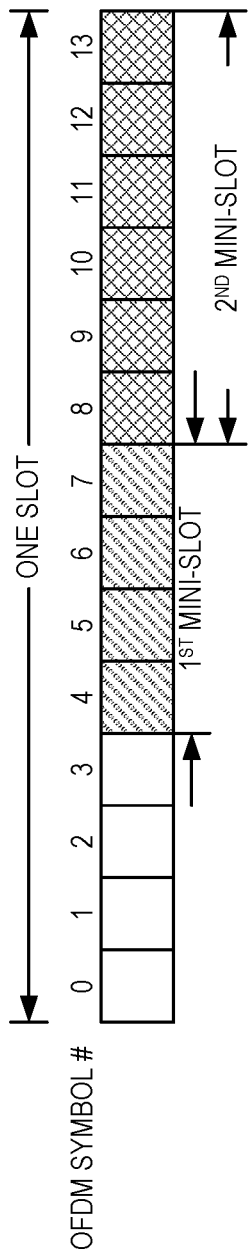
FIG. 11 is a schematic diagram of an exemplary slot that includes two mini slots.

In an alternative embodiment, a new RRC parameter, "PDSCH-AggregationFactor-miniSlot," is introduced to indicate whether a PDSCH is repeated in mini-slot and the number of mini slots. If "PDSCH-AggregationFactor-miniSlot" is configured and the value is greater than 1, then mini-slot repetition is enabled, and the value indicates the number of repetitions in the mini-slots. In another embodiment, the number of repetitions may not be configured explicitly, rather the repetition continues until the end of the slot in which the first mini-slot starts. Furthermore, the number of OFDM symbols in the last mini-slot may be different from the first mini-slot. For example, the first mini-slot starts at OFDM symbol #4 and has a length of 4 OFDM symbols, i.e., it occupies OFDM symbols #4 to #7; the second mini-slot starts at OFDM symbol #8 and continue until the end of the slot, i.e., OFDM symbol #13, as shown in FIG. 11.

In the case of mini-slot repetition, the first TCI state is associated with the first scheduled mini-slot, and the second TCI state is associated with the second mini-slot, and so forth. If the number of mini slots in a slot is more than the number of signaled TCI states, the TCI states are wrapped around circularly. For instance, if there are three mini-slots while two TCI states are signaled, then for the third mini-slot, the first TCI state is assumed.

Another exemplary aspect of the embodiment is related to a differentiating frequency multiplexed PDSCH transmission scheme. With rules defined to differentiate spatially multiplexed, as well as slot-based and mini slot-based time multiplexed PDSCH transmission, it is possible to differentiate frequency multiplexed PDSCH transmission by exclusion:

If the DCI TCI field indicates more than one TCI state (i.e., two TCI states), and the PDSCH transmission cannot be differentiated as spatially multiplexed, slot-based time multiplexed, or mini slot-based time multiplexed using defined rules for indication using DCI and RRC parameters, then the UE shall assume that the PDSCH transmission with the associated TCI states indicated in the DCI TCI field are frequency multiplexed. For example, if neither "pdsch-AggregationFactor" nor "pdsch-AggregationFactor-miniSlot" is configured, and two TCI states and a single CDM group for DMRS are signalled in DCI, and a single set of values for {S, L} (S is the starting symbol relative to the start of the slot, and L is the number of consecutive symbols counting from the symbol S allocated for the PDSCH) is configured, then the UE assumes that (e.g., determines that) a frequency multiplexed PDSCH scheme is configured.

If FDM is determined, then the scheduled RBs are divided based on the number of TCI states signaled. For instance, if two TCI states are signaled, the RBs are divided into two subsets, each associated with one of the TCI states (or TRPs).

In an alternative embodiment for frequency multiplex transmission, the PDSCH is scheduled according to Frequency Domain Resource Allocation (FDRA) to indicate RBs for PDSCH scheduling in the slot, but a frequency domain PDSCH-SplitFactor is introduced to divide the PDSCH resource allocation into multiple PDSCH sub-regions in frequency (i.e. a subset of the scheduled PDSCH RB for each sub-region). For example, a PDSCH allocation of eight RBs is split into two parts (PDSCH-SplitFactor=2), each of four RBs. Each sub-region is also assigned an individual TCI state; so, when the UE receives the PDSCH of the sub-region, it uses the DMRS and the TCI state for that sub-region. The two or more sub-regions may consist of contiguous RBs within the scheduled resource, or of interlaced RBs or interlaced RBGs (resource block groups). The PDSCH-SplitFactor can be indicated in the scheduling DCI, or semi-statically by MAC CE or RRC signaling.

Another exemplary aspect of the embodiment is related to differentiating a combination of spatially multiplexed and time multiplexed PDSCH transmission schemes. With the DCI and/or RRC configurations discussed above, it is possible to simultaneously indicate spatially multiplexed and time multiplexed PDSCH transmissions. Consider the case when the DCI Antenna ports field indicates DMRS ports belonging to more than one DMRS CDM group—indicating spatially multiplexed PDSCH transmission—while parameters for slot-based or mini slot-based time-domain repetition are also defined. In one embodiment, the UE interprets this as defining a combination of spatially multiplexed and time multiplexed PDSCH transmissions, where the TCI states are spatially multiplexed (they refer to different CDM groups) and both the spatially multiplexed PDSCHs are repeated. In another embodiment, the UE interprets the multiple TCI states as an indication to use plain spatially multiplexed PDSCH transmission without any time repetition.

In the exemplary aspects described above, the PDSCH multiplexing scheme differentiation criteria above assumes the order of spatial multiplexing, slot based time multiplexing, mini-slot based time multiplexing, and frequency multiplexing. But the defined criteria can still be used if only a subset of the schemes is supported in NR Rel-16.

PDSCH Transmission Scheme Differentiation Based on Higher Layer Configured Parameters and/or UE Capability In this embodiment, the UE is explicitly configured by a higher layer with the PDSCH scheme it expects to receive when a DCI TCI field indicates more than one TCI state. For instance, an RRC parameter may take one of the values among spatial multiplexing, frequency multiplexing, slot-based time multiplexing, and mini-slot based time multiplexing.

In one embodiment, which PDSCH multiplexing scheme to use is configured on a per Control Resource Set (CORESET) basis so that PDCCHs received in different CORESETs can be associated with different PDSCH multiplexing schemes. In another embodiment, different PDSCH multiplexing schemes are allocated different Radio Network Temporary Identifier (RNTI) values whereby the UE may infer which PDSCH multiplexing scheme is used based on which RNTI the CRC of the scheduling DCI was scrambled with.

In another variant of this embodiment, the UE may be RRC configured a combination of more than one PDSCH transmission scheme. For instance, an RRC parameter may indicate one of the following combined schemes:

a combination of spatially multiplexed and frequency multiplexed schemes;

a combination of frequency multiplexed and slot-based time multiplexed schemes;

a combination of frequency multiplexed and mini-slot based time multiplexed schemes; and a combination of spatially multiplexed and slot-based or mini-slot based multiplexed schemes.

In another embodiment, a RRC parameter, "PDSCH-repetition-type," is introduced to explicitly indicate whether FDM or TDM, including any sub-types such as single RV or multiple RVs, should be used if multiple TCI states and a single CDM group for DMRS are signaled in DCI. SDM is assumed by UE if multiple TCI states and multiple CDM groups are signaled in DCI regardless of the RRC parameter "PDSCH-repetition-type" configuration. In this way, SDM and TDM/FDM can be dynamically switched according to, for example, eMBB or URLLC traffic types.

In some embodiments, the UE indicates to the gNB which of the PDSCH multiplexing schemes it can support as part of UE capability signaling. Hence, when the gNB schemes PDSCH transmission associated with multiple TCI states, the UE expects the PDSCH transmission scheme to follow the multiplexing scheme it indicated as part of its UE capability. This way the PDSCH multiplexing scheme is differentiated at the UE.

Figure 12:
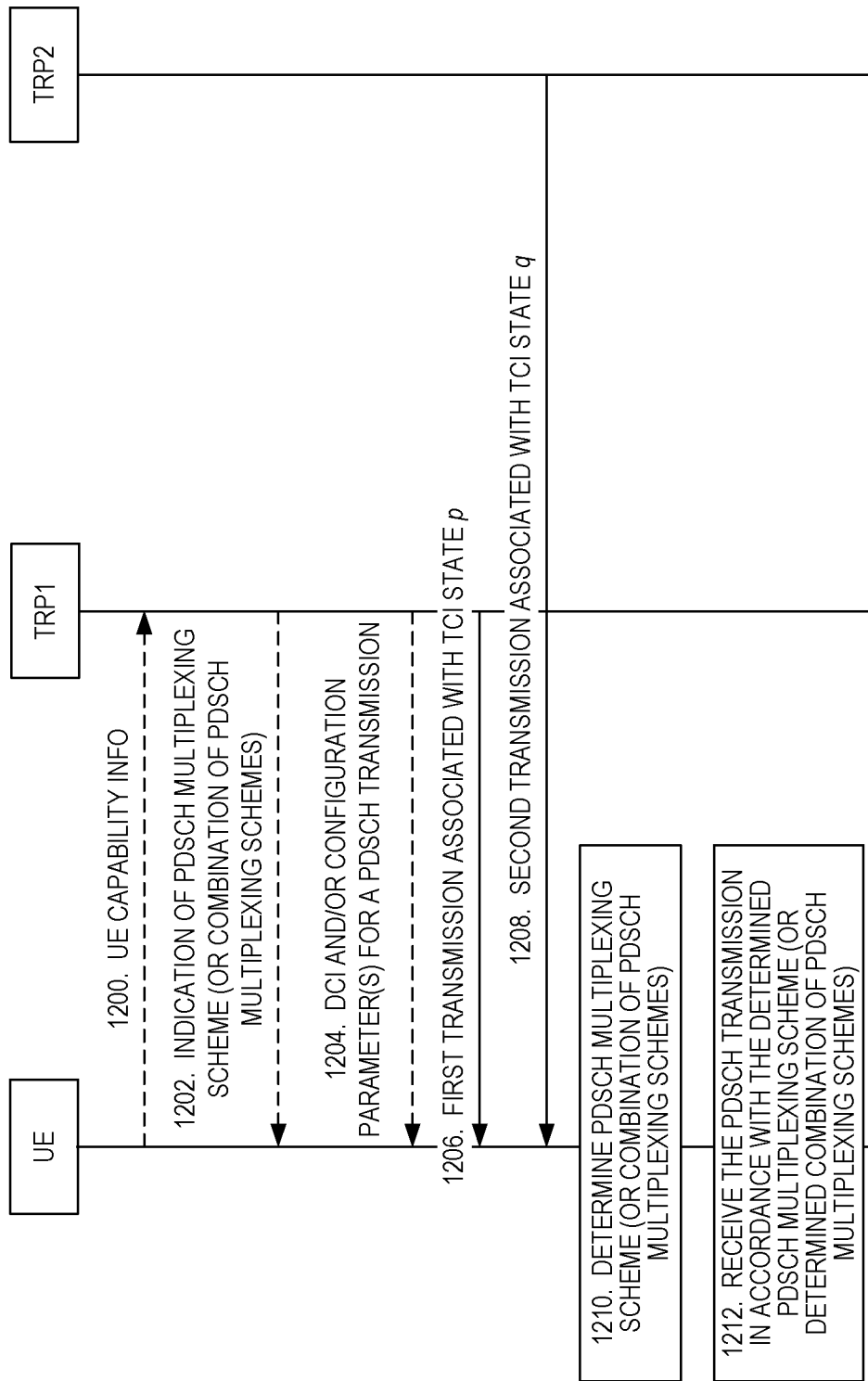
FIG. 12 illustrates an example of the operation of a User Equipment (UE) (e.g., wireless device) and two TRPs in accordance with at least some of the embodiments of the present disclosure.

FIG. 12 illustrates an example of the operation of a UE (e.g., wireless device 1012) and two TRPs in accordance with at least some of the embodiments described above. Optional steps are represented by dashed lines. Further, while referred to as "steps," the steps may be performed in any appropriate order and, sometimes, steps may be performed in parallel. Note that the two TRPs may be implemented at separate base stations or implemented at the same base station depending on the particular implementation. Further, while only two TRPs are illustrated for clarity and ease of discussion, there may be any number of TRPs.

As illustrated, in some embodiments (optionally), the UE sends capability information to a network node, which in this example is a base station operating as a first TRP (TRP1) (step 1200). As discussed above, in some embodiments, the capability information may comprise information that indicates which PDSCH multiplexing schemes that the UE supports. In some embodiments (optionally), TRP1 sends signaling to the UE that explicitly indicates to the UE which PDSCH multiplexing scheme or which combination of PDSCH multiplexing schemes the UE is expected to receive (step 1202).

Figure 1:
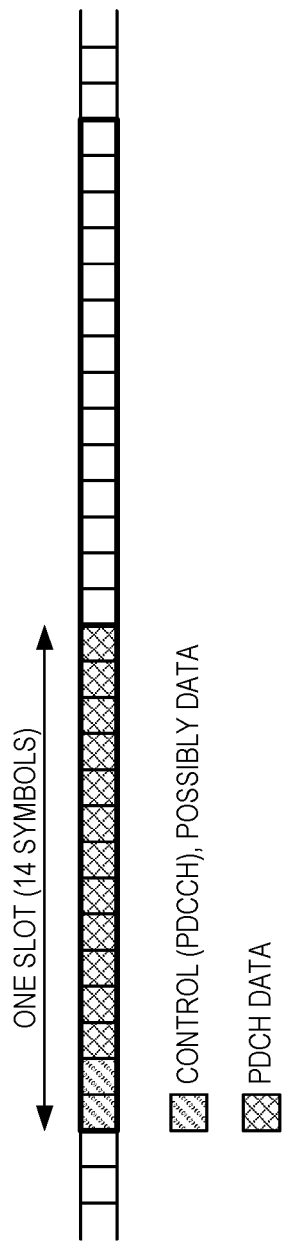
FIG. 1 is a schematic diagram of an exemplary Fifth Generation-New Radio (5G NR) time-domain structure.
Figure 2:
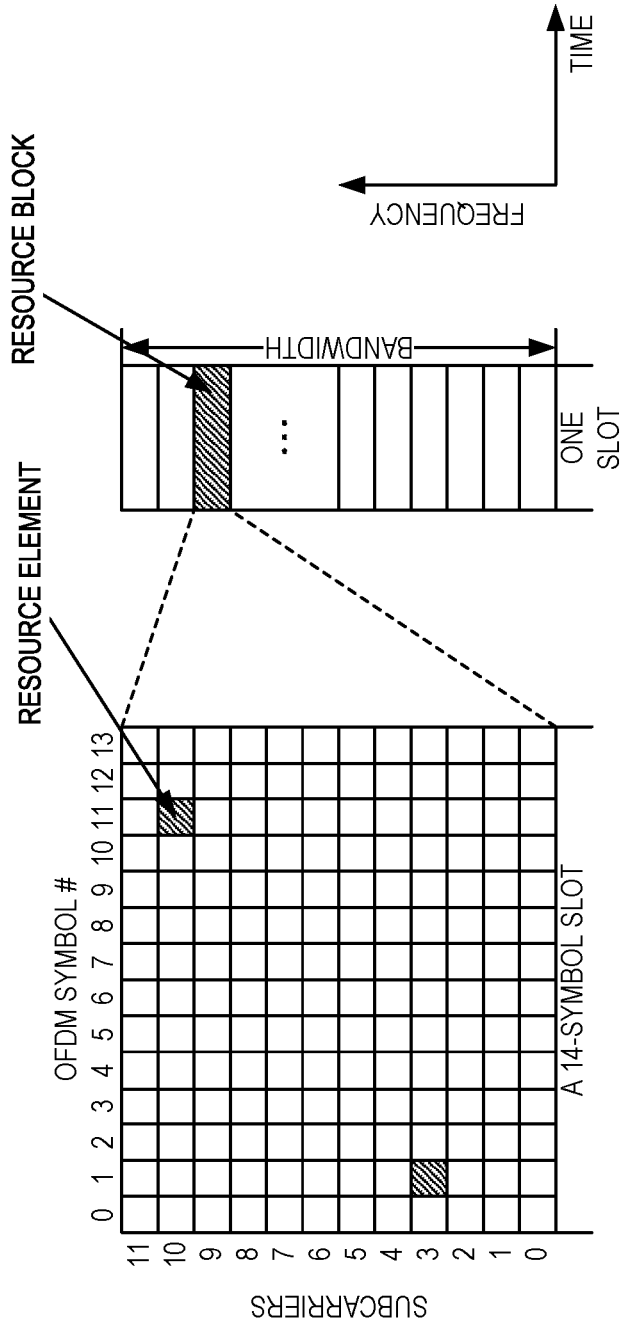
FIG. 2 is a schematic diagram of an exemplary 5G NR physical resource grid.
Figure 3:
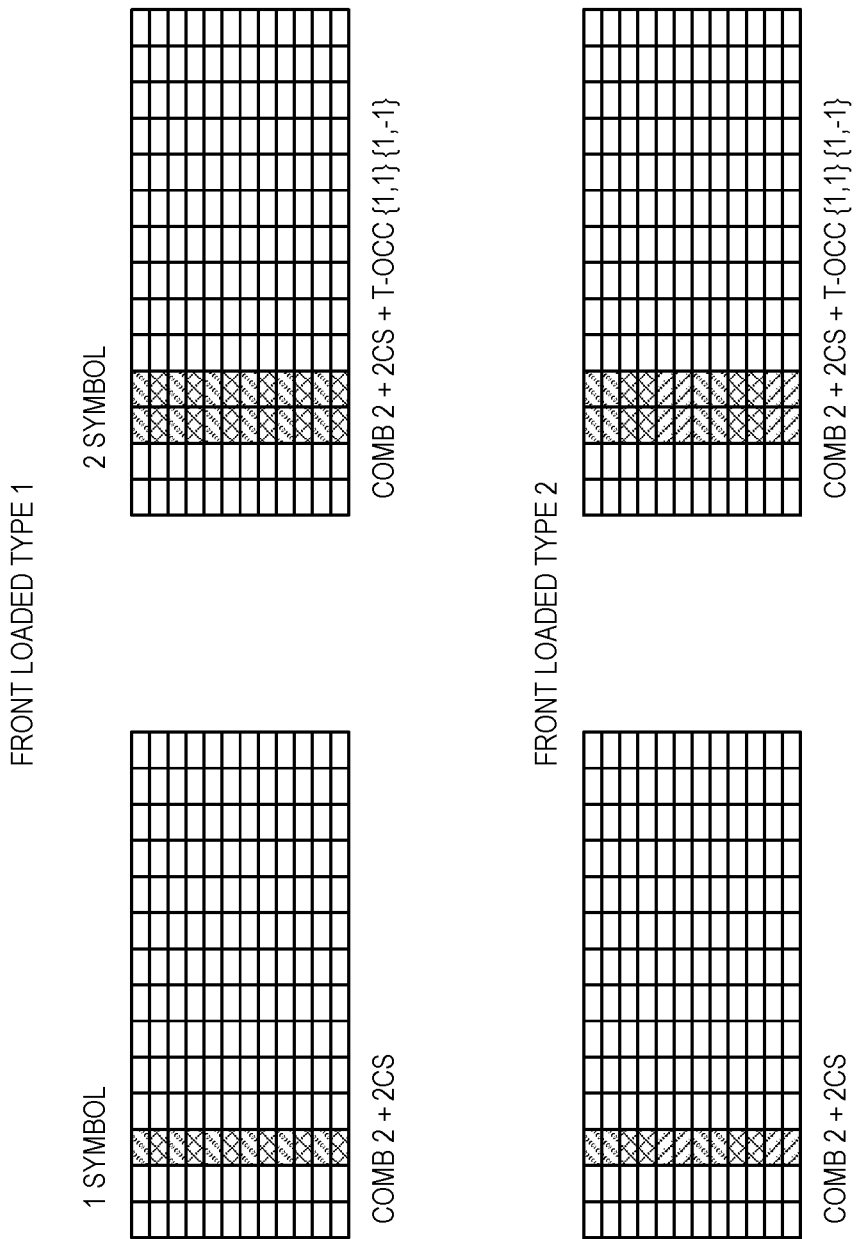
FIG. 3 is a schematic diagram of exemplary front-loaded Demodulation Reference Signal (DMRS) configurations.
Figure 4:
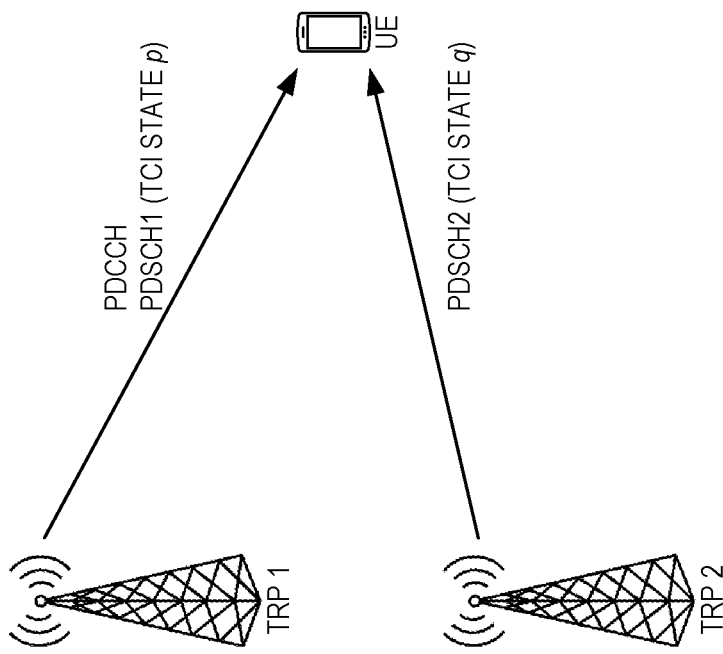
FIG. 4 is a schematic diagram providing an exemplary illustration of 5G NR Rel-16 enhancement for Physical Downlink Shared Channel (PDSCH)
Figure 5:
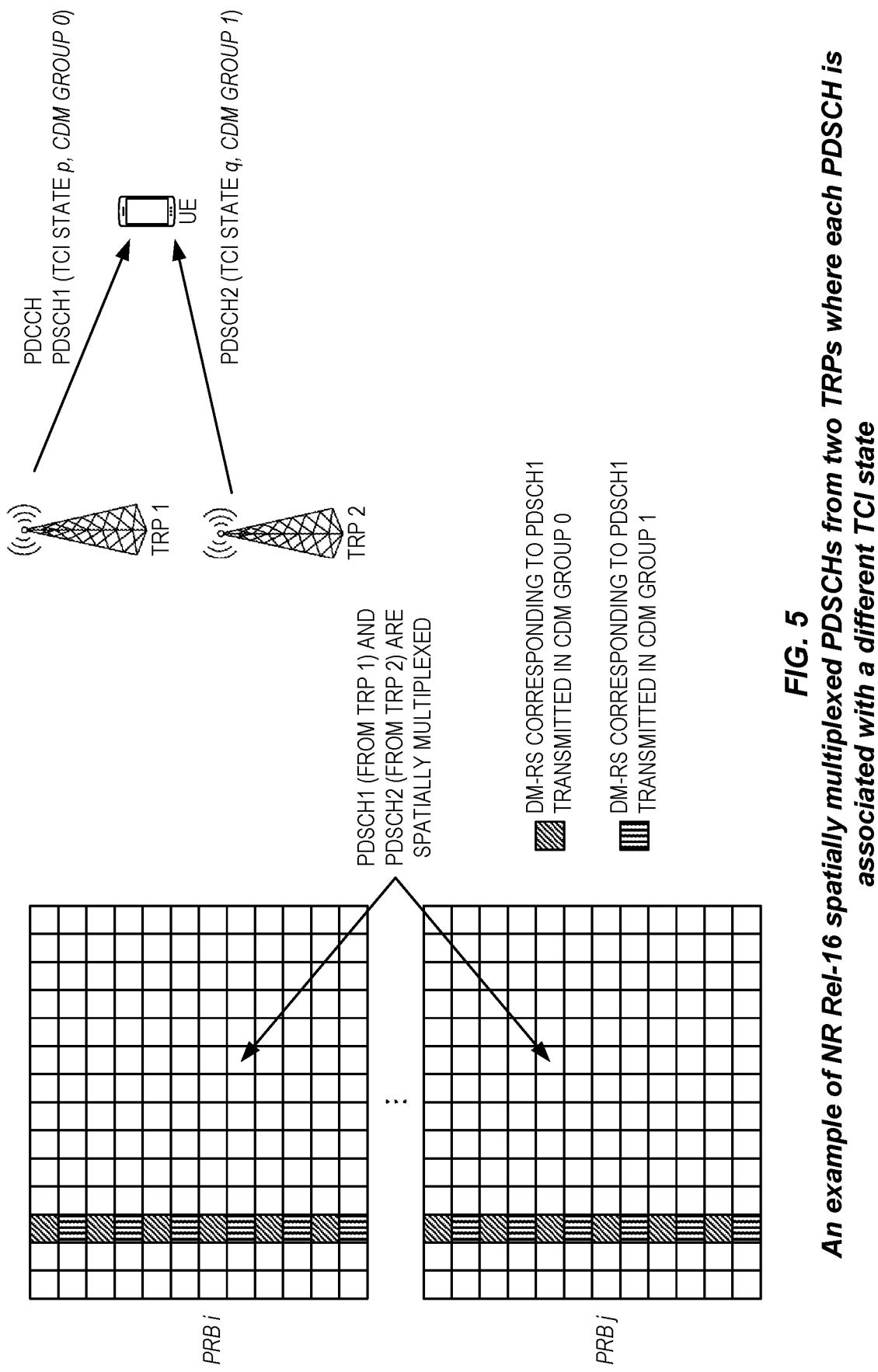
FIG. 5 is a schematic diagram providing an exemplary illustration of 5G NR Rel-16 spatially multiplexed PDSCHs associated with multiple Transmission/Reception Points (TRPs)
Figure 6:
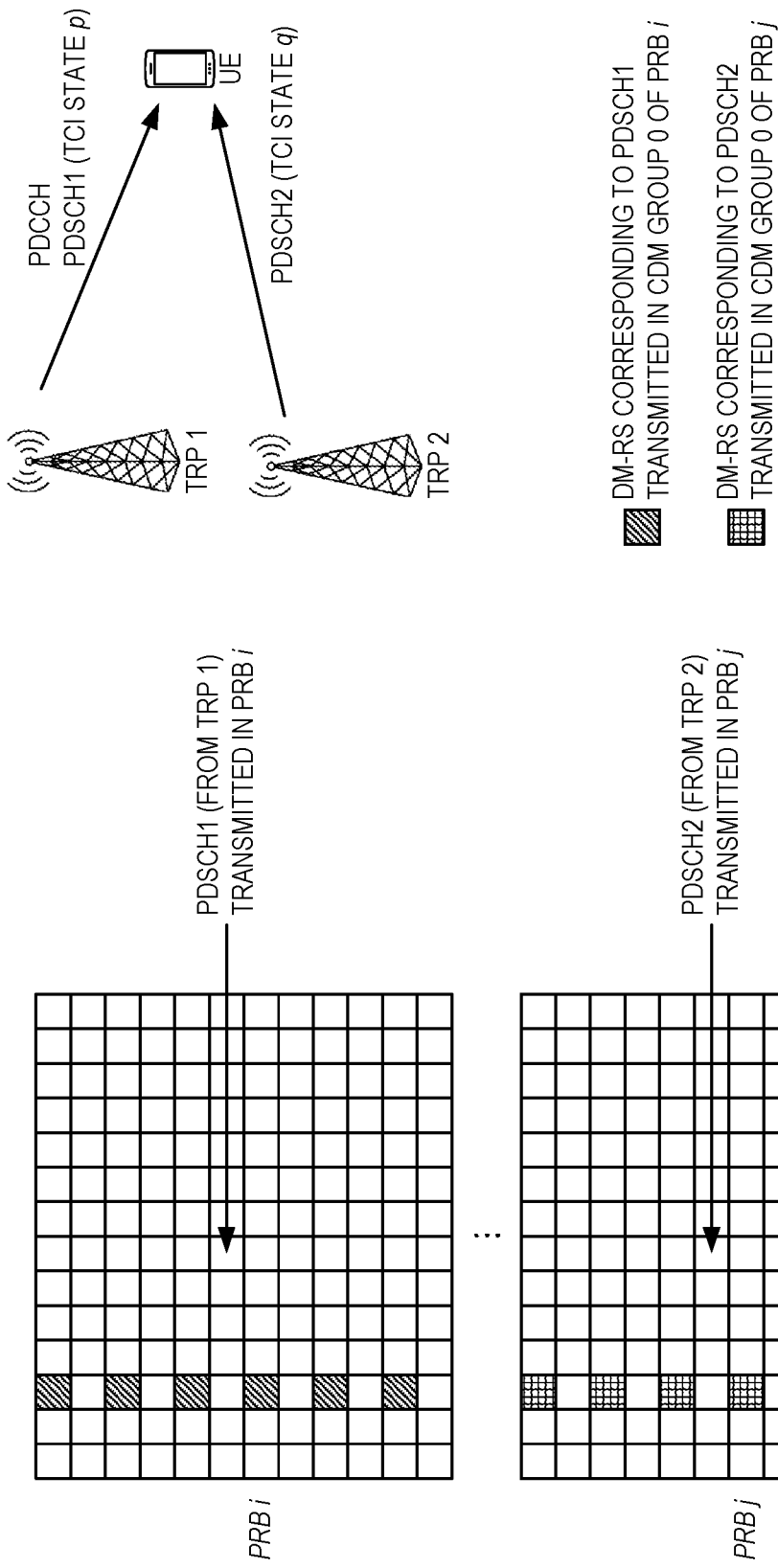
FIG. 6 is a schematic diagram providing an exemplary illustration of 5G NR Rel-16 frequency multiplexed PDSCHs associated with multiple TRPs.
Figure 7:
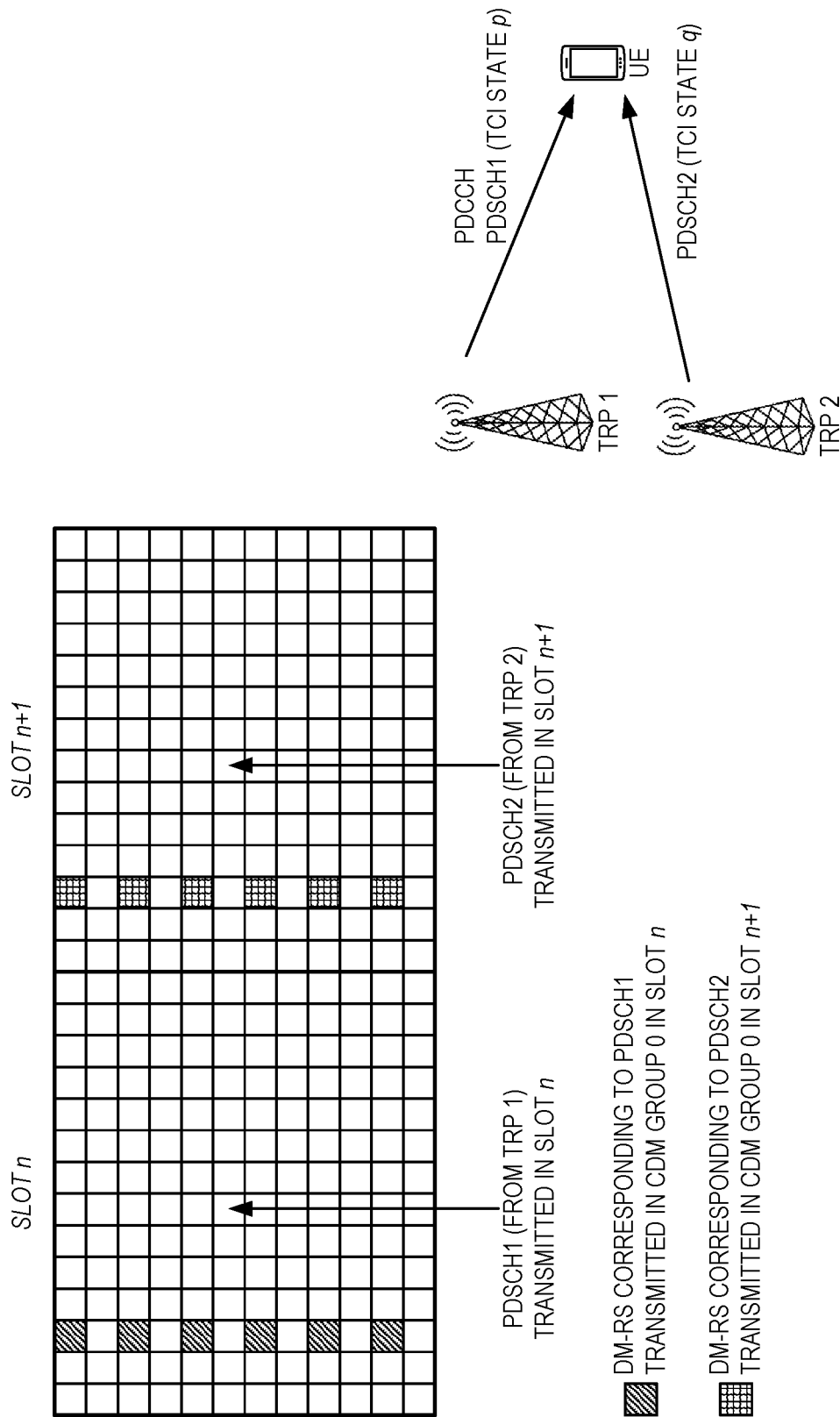
FIG. 7 is a schematic diagram providing an exemplary illustration of 5G NR Rel-16 slot-based multiplexed PDSCHs associated with multiple TRPs.
Figure 8:
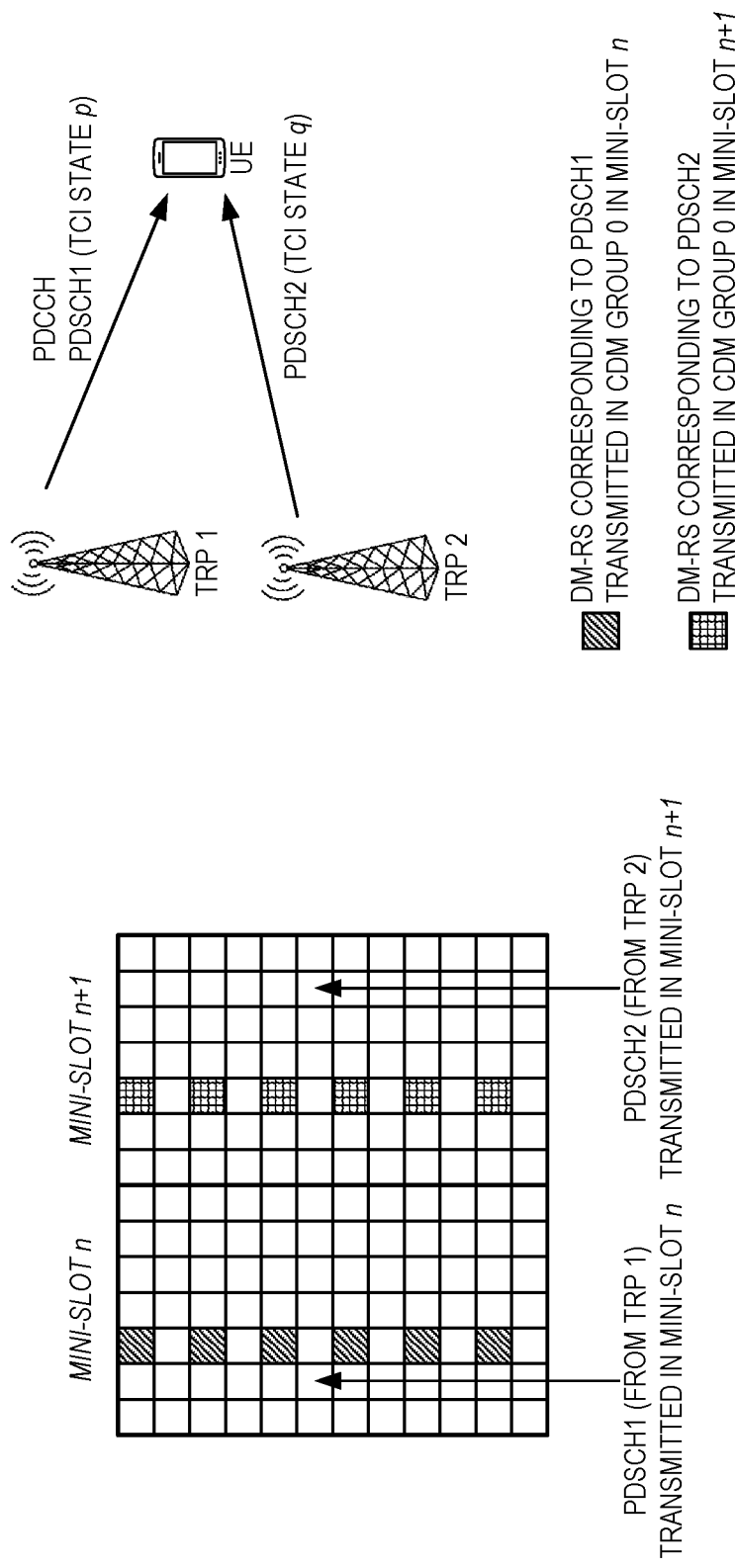
FIG. 8 is a schematic diagram providing an exemplary illustration of 5G NR Rel-16 mini slot-based multiplexed PDSCHs associated with multiple TRPs.
Figure 9:
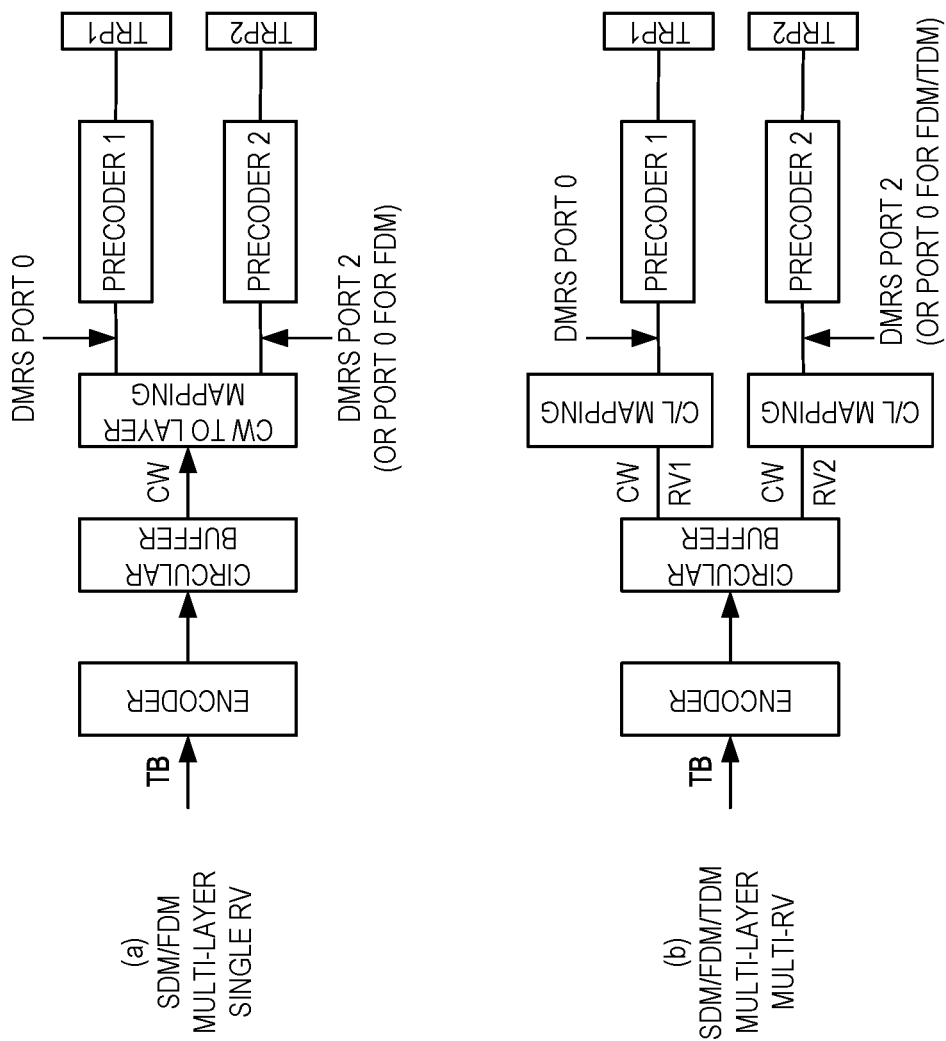
FIG. 9 is a schematic diagram providing an exemplary illustration of Spatial Division Multiplexing (SDM) and Frequency Division Multiplexing (FDM) transmissions with single or multiple Redundancy Versions (RV) for PDSCH transmission over multiple TRPs.

TRP1 sends DCI and configuration parameters (e.g., RRC configuration parameter(s)) to the UE for a PDSCH transmission that includes a first transmission of a first layer or a first set of layers associated with a first TCI state and a second transmission of a second layer or a second set of layers associated with a second TCI state (step 1204). Notably, in step 1204, the PDSCH transmission can also be said to include the one or more PDSCHs associated with the first TCI state and with the second TCI state. In this example, TRP1 transmits the first transmission (step 1206), and a second TRP (TRP2) transmits the second transmission (step 1208). Notably, the first and second TCI states may be different TCI states. In this particular example, it is assumed that the first and second TCI states are in fact different TCI states. The first transmission and the second transmission are multiplexed in accordance with one (or a combination of) a number of PDSCH multiplexing schemes. As discussed above, these PDSCH multiplexing schemes may include, for example, one or more spatial multiplexing schemes (see, e.g., FIG. 5 and FIG. 9), one or more frequency multiplexing schemes (see, e.g., FIG. 6 and FIG. 9), a slot-based time multiplexing scheme (see, e.g., FIG. 7), and a mini-slot-based time multiplexing scheme (see, e.g., FIG. 8).

The UE determines the particular PDSCH multiplexing scheme (or combination of PDSCH multiplexing schemes) used for the PDSCH transmission in accordance with any one of the embodiments described above, e.g., in Section 1 or Section 2 (step 1210). For example, the UE may determine the particular PDSCH multiplexing scheme (or combination of PDSCH multiplexing schemes) used for the PDSCH transmission based on the DCI and/or configuration parameters received in step 1204 (e.g., using any of the embodiments described above in Section 1), based on explicit signaling (e.g., using any of the respective embodiments described in Section 2), and/or based on the UE capabilities signaled to TRP1 in step 1200 (e.g., using any of the respective embodiments described in Section 2).

The UE receives the PDSCH transmission in accordance with the determined PDSCH multiplexing scheme (or determined combination of PDSCH multiplexing schemes) (step 1212).

Figure 13:
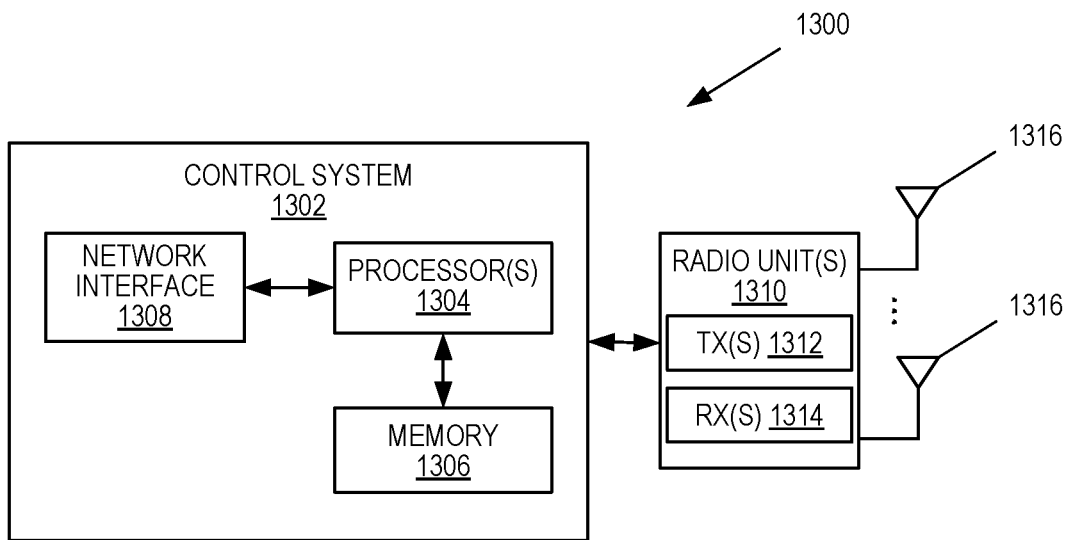
FIG. 13 is a schematic block diagram of a radio access node according to some embodiments of the present disclosure.

FIG. 13 is a schematic block diagram of a radio access node 1300 according to some embodiments of the present disclosure. The radio access node 1300 may be, for example, a base station 1002 or 1006 or a TRP(s). As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), a memory 1306, and a network interface 1308. The one or more processors 1304 are also referred to herein as processing circuitry. In addition, the radio access node 1300 includes one or more radio units 1310 that each include one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein (e.g., one or more functions of a base station or TRP as described herein). In some embodiments, the function(s) is implemented in software that is stored, e.g., in the memory 1306 and executed by the one or more processors 1304.

Figure 14:
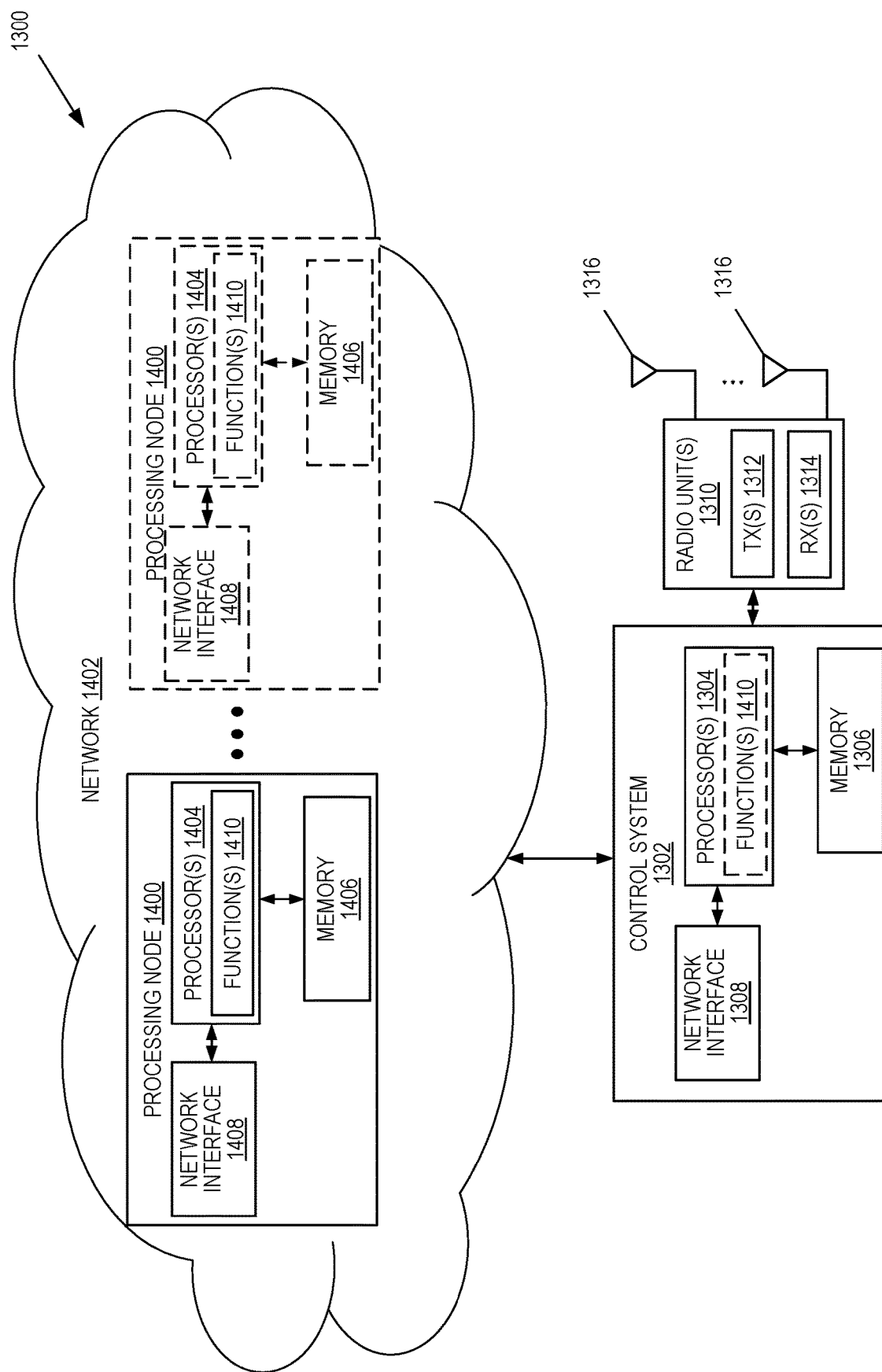
FIG. 14 is a schematic block diagram that illustrates a virtualized embodiment of the radio access node of FIG. 13 according to some embodiments of the present disclosure.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308, and the one or more radio units 1310 that each include the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), a memory 1406, and a network interface 1408.

In this example, functions 1410 of the radio access node 1300 described herein (e.g., one or more functions of a base station or TRP as described herein) are implemented at the one or more processing nodes 1400 or distributed across the control system 1302 and the one or more processing nodes 1400 in any desired manner. In some particular embodiments, some or all of the functions 1410 of the radio access node 1300 described herein (e.g., one or more functions of a base station or TRP as described herein) are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicates directly with the processing node(s) 1400 via an appropriate network interface(s).

In some embodiments, a computer program including instructions which, when executed by at least one processor, causes the at least one processor to carry out the functionality of the radio access node 1300 (e.g., one or more functions of a base station or TRP as described herein) or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
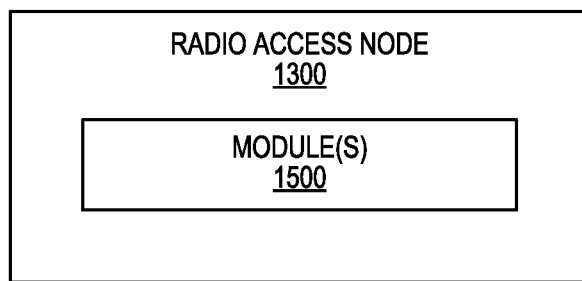
FIG. 15 is a schematic block diagram of the radio access node of FIG. 13 according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein (e.g., one or more functions of a base station or TRP as described herein). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
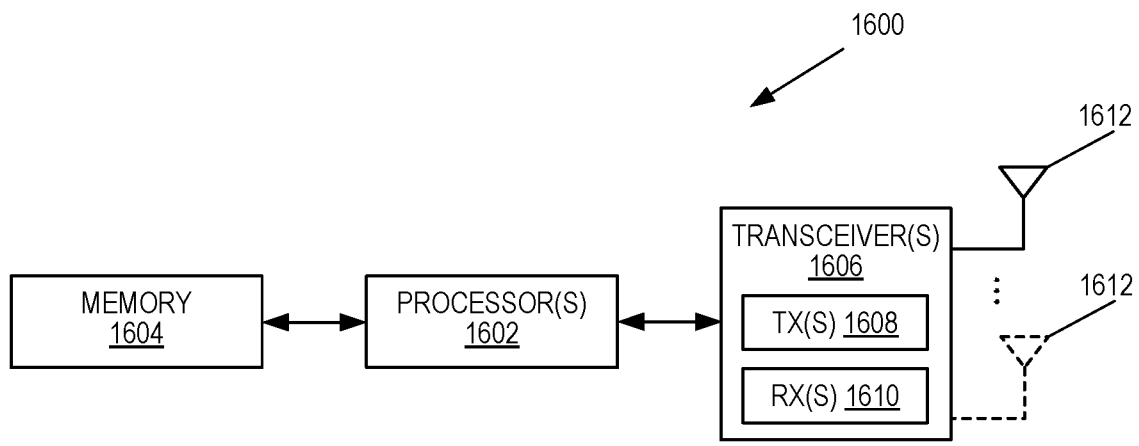
FIG. 16 is a schematic block diagram of a UE according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), a memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by one of ordinary skill in the art. The processors 1602 are also referred to herein as processing circuitry. The transceivers 1606 are also referred to herein as radio circuitry. In some embodiments, the functionality of the UE 1600 described above (e.g., one or more functions of a wireless device or UE as described herein) may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions, which when executed by at least one processor 1602, causes the at least one processor 1602 to carry out the functionality of the UE 1600 according to any of the embodiments described herein (e.g., one or more functions of a wireless device or UE as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
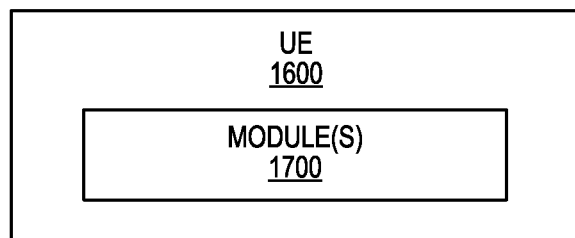
FIG. 17 is a schematic diagram of the UE of FIG. 11 according to some embodiments of the present disclosure.

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein (e.g., one or more functions of a wireless device or UE as described herein).

Figure 18:
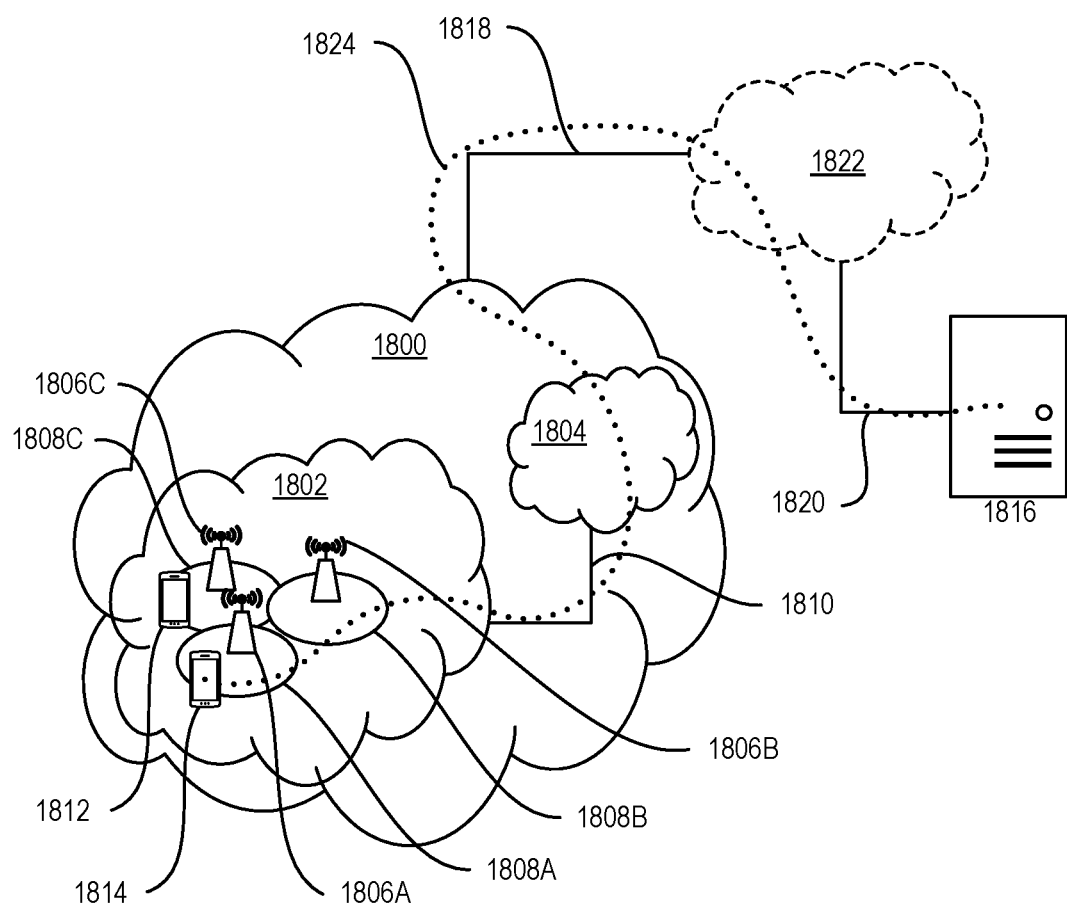
FIG. 18 is a schematic diagram of a communication system that includes a telecommunication network according to some embodiments of the present disclosure.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as NBs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in the coverage area 1808C is configured to wirelessly connect to, or be paged by, the corresponding base station 1806C. A second UE 1814 in coverage area 1808A is wirelessly connected to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
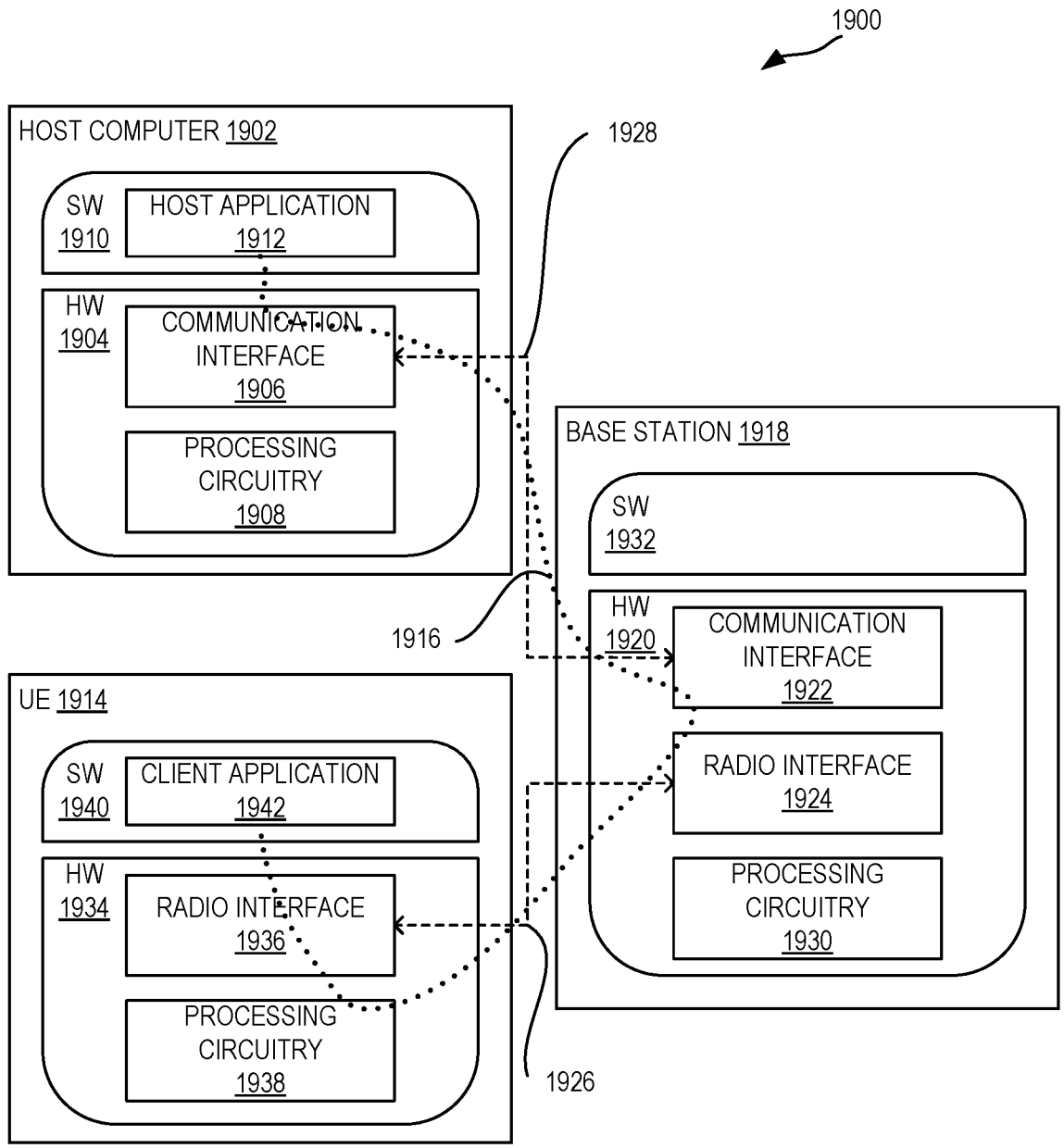
FIG. 19 is a schematic diagram of a communication system including a host computer according to some embodiments of the present disclosure.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a UE in a cellular communications system, the method comprising one or more of: determining (1210) a transmission scheme or a combination of transmission schemes for a data transmission, the data transmission comprising a first transmission of a first layer or a first set of layers associated with a first transmission configuration indication state and a second transmission of a second layer or a second set of layers associated with a second transmission configuration indication state; and receiving (1212) the data transmission in accordance with the determined transmission scheme or the determined combination of transmission schemes.

Note: In embodiments 1-58, the data transmission may correspond to multi-TRP transmission and other embodiments.

Embodiment 2: The method of embodiment 1 wherein the data transmission is a PDSCH transmission, the first transmission is a first PDSCH transmission, and the second transmission is a second PDSCH transmission.

Embodiment 2a: The method of embodiments 1 or 2 wherein the first transmission and the second transmission are for the same transport block.

Embodiment 3: The method of embodiment 1 or 2 wherein determining (1210) a transmission scheme or a combination of transmission schemes for the data transmission comprises determining (1210) a transmission scheme for the data transmission.

Embodiment 4: The method of embodiment 3 wherein the transmission scheme is one of two or more possible transmission schemes for the data transmission, the two or more possible transmission schemes comprising at least one of the following transmission schemes: one or more spatial multiplexing transmission schemes; one or more frequency multiplexing transmission schemes; a slot-based time multiplexing transmission scheme; and a mini-slot-based time multiplexing transmission scheme.

Embodiment 5: The method of embodiment 1 or 2 wherein determining (1210) a transmission scheme or a combination of transmission schemes for the data transmission comprises determining (1210) a combination of two or more transmission schemes for the data transmission.

Embodiment 6: The method of embodiment 5 wherein the combination of two or more transmission schemes is a combination of two or more possible transmission schemes for the data transmission, the two or more possible transmission schemes comprising one or more of: one or more spatial multiplexing transmission schemes; one or more frequency multiplexing transmission schemes; a slot-based time multiplexing transmission scheme; and/or a mini-slot-based time multiplexing transmission scheme.

Embodiment 7: The method of embodiment 4 or 6 wherein the data transmission is a PDSCH transmission, the first transmission is a first PDSCH transmission, the second transmission is a second PDSCH transmission, and determining (1210) the transmission scheme or the combination of transmission schemes for the data transmission comprises determining (1210) the transmission scheme or the combination of transmission schemes for the data transmission based on one or more of: information indicated in downlink control information scheduling the PDSCH transmission; information signaled to the UE via a higher layer configuration; and/or capability signaling indicated from UE to the network.

Embodiment 8: The method of embodiment 7 wherein determining (1210) the transmission scheme or the combination of transmission schemes for the data transmission comprises determining (1210) the transmission scheme or the combination of transmission schemes for the data transmission based on the information indicated in the downlink control information scheduling the data transmission, and the information indicated in the downlink control information scheduling the data transmission comprises one or more of: a field (e.g., DCI Antenna ports field) in the downlink control information that indicates the number of DMRS CDM groups to which indicated DMRS ports belong; and/or Time Domain Resource Allocation (TDRA) information indicated in the downlink control information, the TDRA information comprising information on a starting symbol(s) in a respective slot for reception and a length or duration of reception (e.g., SLIV).

Embodiment 9: The method of embodiment 7 or 8, wherein determining (1210) the transmission scheme or the combination of transmission schemes for the data transmission comprises determining (1210) the transmission scheme or the combination of transmission schemes for the data transmission based on the information signaled to the UE via the higher layer configuration, and the information signaled to the UE via the higher layer configuration comprises one or more of:

a number of repetitions defined in terms of multiple slots (e.g., the aggregation factor) configured to the UE;

a time-domain PDSCH split-factor that divides a PDSCH duration in one slot into multiple PDSCH sub-durations;

a number of repetitions defined in terms of multiple mini-slots (e.g., mini-slot aggregation factor) configured to the UE;

a frequency-domain PDSCH split-factor that divides a PDSCH resource allocation into multiple PDSCH sub-regions in frequency;

a higher layer parameter that may take a value representative of one of at least two or more of the following data transmission schemes:
spatial multiplexing;
frequency multiplexing;
slot-based time multiplexing; and
mini-slot based time multiplexing; and/or a higher layer parameter that may take one of at least two or more of the following combined schemes:
a combination of spatially multiplexed and frequency multiplexed schemes;
a combination of frequency multiplexed and slot-based time multiplexed schemes;
a combination of frequency multiplexed and mini-slot based time multiplexed schemes; and
a combination of spatially multiplexed and slot-based or mini-slot based multiplexed schemes.

Embodiment 10: The method of any one of embodiments 4 and 6 to 9 wherein determining (1210) the transmission scheme or the combination of transmission schemes for the data transmission comprises determining (1210) that the transmission scheme is or the combination of transmission schemes comprises a spatial multiplexing scheme from among the one or more spatial multiplexing schemes if: a DCI Transmission Configuration Indication field indicates more than one TCI state (e.g., two TCI states); and the DCI Antenna ports field indicates DMRS ports belonging to more than one DMRS CDM group.

Embodiment 11: The method of any one of embodiments 4 and 6 to 10 wherein determining (1210) the transmission scheme or the combination of transmission schemes for the data transmission comprises determining (1210) that the transmission scheme is or the combination of transmission schemes comprises the slot-based time multiplexing scheme if: the DCI Transmission Configuration Indication field indicates more than one TCI state (e.g., two TCI states); the DCI Antenna ports field indicates DMRS ports belonging to one DMRS CDM group; and the UE is configured with an aggregation factor defined in terms of slots with a value larger than 1 slot.

Embodiment 12: The method of any one of embodiments 4 and 6 to 11 wherein determining (1210) the transmission scheme or the combination of transmission schemes for the data transmission comprises determining (1210) that the transmission scheme is or the combination of transmission schemes comprises the mini slot-based time multiplexing scheme if:
the DCI Transmission Configuration Indication field indicates more than one TCI state (e.g., two TCI states);
the DCI Antenna ports field indicates DMRS ports belonging to one DMRS CDM group;
the UE is not configured an aggregation factor; and
if one of the following criterion is met:
a. the TDRA row value indicated in DCI indicates multiple start times (or in addition multiple lengths);
b. if the UE is configured with a time domain PDSCH split-factor with a value larger than 1; and c. if the UE is configured with a number of repetitions defined in terms of mini-slots with a value larger than one mini-slot.

Embodiment 13: The method of any one of embodiments 4 and 6 to 12 wherein determining (1210) the transmission scheme or the combination of transmission schemes for the data transmission comprises determining (1210) that the transmission scheme is or the combination of transmission schemes comprises a frequency multiplexing scheme from among the one or more frequency multiplexing schemes if none of the criteria in any one of embodiments 10 to 12 are met.

Embodiment 14: The method of any one of embodiments 4 and 6 to 12 wherein determining (1210) the transmission scheme or the combination of transmission schemes for the data transmission comprises determining (1210) that the transmission scheme is or the combination of transmission schemes comprises a frequency multiplexing scheme from among the one or more frequency multiplexing schemes if: the DCI Transmission Configuration Indication field indicates more than one TCI state (e.g., two TCI states); the DCI Antenna ports field indicates DMRS ports belonging to one DMRS CDM group; and the UE is configured with a time domain PDSCH split-factor with a value larger than 1.

Embodiment 15: A method in a UE for differentiating a plurality of PDSCH transmission schemes, where transmission is received with multiple TCI states, based on one or more of:
   a. information indicated in the DCI scheduling the PDSCH transmission;
   b. information signaled to the UE via a higher layer configuration; and
   c. capability signaling indicated from UE to the gNB.

Embodiment 16: The method of embodiment 15 where the plurality of PDSCH transmission schemes includes one or more of spatial multiplexing, frequency multiplexing, slot-based time multiplexing, and mini-slot based time multiplexing.

Embodiment 17: The method of any one of embodiments 15 to 16, where the information indicated in the DCI scheduling the PDSCH transmission may include one or more of:
   a. the DCI Antenna ports field which indicates the number of DMRS CDM groups to which the indicated DMRS ports belong to; and
   b. the TDRA information indicated in DCI which includes information on the starting symbol(s) in the slot for PDSCH reception and the length or duration of PDSCH reception (referred to as SLIV).

Embodiment 18: The method of any one of embodiments 15 to 16, where the information signaled to the UE via the higher layer configuration may include one or more of:
   a. a number of repetitions defined in terms of multiple slots (i.e. the aggregation factor) configured to the UE;
   b. a time-domain PDSCH split-factor that divides the PDSCH duration in one slot into multiple PDSCH sub-durations;
   c. a number of repetitions defined in terms of multiple mini-slots (i.e., mini-slot aggregation factor) configured to the UE;
   d. a frequency-domain PDSCH split-factor that divides the PDSCH resource allocation into multiple PDSCH sub-regions in frequency;
   e. a higher layer parameter that may take one of the values among spatial multiplexing, frequency multiplexing, slot-based time multiplexing, mini-slot based time multiplexing; and
   f. a higher layer parameter that may take one of the following combined schemes:
      i. a combination of spatially multiplexed and frequency multiplexed schemes;
      ii. a combination of frequency multiplexed and slot-based time multiplexed schemes;
      iii. a combination of frequency multiplexed and mini-slot based time multiplexed schemes; and
      iv. a combination of spatially multiplexed and slot-based or mini-slot based multiplexed schemes.

Embodiment 19: The method of any one of embodiments 15 to 18 where the spatial multiplexing based PDSCH transmission is differentiated if the DCI Transmission Configuration Indication field indicates more than one TCI state (e.g., two TCI states), and the DCI Antenna ports field indicates DMRS ports belonging to more than one DMRS CDM group.

Embodiment 20: The method of any one of embodiments 15 to 18 where the slot-based time multiplexing based PDSCH transmission is differentiated if the DCI TCI field indicates more than one TCI state (e.g., two TCI states), the DCI Antenna ports field indicates DMRS ports belonging to one DMRS CDM group, and the UE is configured with an aggregation factor defined in terms of slots with a value larger than 1 slot.

Embodiment 21: The method of any one of embodiments 15 to 18 where the mini slot-based time multiplexing based PDSCH transmission is differentiated if the DCI Transmission Configuration Indication field indicates more than one TCI state (e.g., two TCI states), the DCI Antenna ports field indicates DMRS ports belonging to one DMRS CDM group, the UE is not configured an aggregation factor, and if one of the following criterion is met:
   a. the TDRA row value indicated in DCI indicates multiple start times (or in addition multiple lengths);
   b. if the UE is configured with a time domain PDSCH split-factor with a value larger than 1; and
   c. if the UE is configured with a number of repetitions defined in terms of mini-slots with a value larger than 1 mini-slot.

Embodiment 22: The method of any one of embodiments 15 to 21, the frequency multiplexing based PDSCH transmission is differentiated if none of the criterions in any one of embodiments 19 to 21 are met.

Embodiment 23: The method of any one of embodiments 15 to 21, the frequency multiplexing based PDSCH transmission is differentiated if the DCI Transmission Configuration Indication field indicates more than one TCI state (e.g., two TCI states), the DCI Antenna ports field indicates DMRS ports belonging to one DMRS CDM group, and the UE is configured with a time domain PDSCH split-factor with a value larger than 1.

Embodiment 24: The method of any of the previous embodiments, further comprising:
   providing user data; and
   forwarding the user data to a host computer via the transmission to the base station.

Group B Embodiments

Embodiment 25: A method performed by a base station comprising: providing (1202), to a UE, an explicit indication of a transmission scheme or a combination of transmission schemes to be expected by the UE for a data transmission.

Embodiment 25a: The method of embodiment 25 wherein the data transmission comprises a first transmission of a first layer or a first set of layers associated with a first transmission configuration indication state and a second transmission of a second layer or a second set of layers associated with a second transmission configuration indication state.

Embodiment 26: The method of any of the previous embodiments, further comprising: obtaining user data; and forwarding the user data to a host computer or a wireless device.

Group C Embodiments

Embodiment 27: A wireless device comprising: processing circuitry configured to perform any of the steps of any of the Group A embodiments; and power supply circuitry configured to supply power to the wireless device.

Embodiment 28: A base station comprising: processing circuitry configured to perform any of the steps of any of the Group B embodiments; and power supply circuitry configured to supply power to the base station.

Embodiment 29: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application, thereby providing the user data; and the UE comprises processing circuitry configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 35: The method of the previous embodiment, further comprising, at the base station, transmitting the user data.

Embodiment 36: The method of the previous 2 embodiments, wherein the user data is provided at the host computer by executing a host application, the method further comprising, at the UE, executing a client application associated with the host application.

Embodiment 37: A User Equipment, UE, configured to communicate with a base station, the UE comprising a radio interface and processing circuitry configured to perform the method of the previous 3 embodiments.

Embodiment 38: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 39: The communication system of the previous embodiment, wherein the cellular network further includes a base station configured to communicate with the UE.

Embodiment 40: The communication system of the previous 2 embodiments, wherein: the processing circuitry of the host computer is configured to execute a host application, thereby providing the user data; and the UE's processing circuitry is configured to execute a client application associated with the host application.

Embodiment 41: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 42: The method of the previous embodiment, further comprising at the UE, receiving the user data from the base station.

Embodiment 43: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 44: The communication system of the previous embodiment, further including the UE.

Embodiment 45: The communication system of the previous 2 embodiments, further including the base station, wherein the base station comprises a radio interface configured to communicate with the UE and a communication interface configured to forward to the host computer the user data carried by a transmission from the UE to the base station.

Embodiment 46: The communication system of the previous 3 embodiments, wherein: the processing circuitry of the host computer is configured to execute a host application; and the UE's processing circuitry is configured to execute a client application associated with the host application, thereby providing the user data.

Embodiment 47: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 48: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 49: The method of the previous embodiment, further comprising, at the UE, providing the user data to the base station.

Embodiment 50: The method of the previous 2 embodiments, further comprising: at the UE, executing a client application, thereby providing the user data to be transmitted; and at the host computer, executing a host application associated with the client application.

Embodiment 51: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 52: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 53: The communication system of the previous embodiment further including the base station.

Embodiment 54: The communication system of the previous 2 embodiments, further including the UE, wherein the UE is configured to communicate with the base station.

Embodiment 55: The communication system of the previous 3 embodiments, wherein: the processing circuitry of the host computer is configured to execute a host application; and the UE is configured to execute a client application associated with the host application, thereby providing the user data to be received by the host computer.

Embodiment 56: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 57: The method of the previous embodiment, further comprising at the base station, receiving the user data from the UE.

Embodiment 58: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3G Third Generation
3GPP Third Generation Partnership Project
4G Fourth Generation
5G Fifth Generation
5GC Fifth Generation Core
5G NR Fifth Generation New Radio
5GS Fifth Generation System
AF Application Function
AMF Access and Mobility Function
AN Access Network
AP Access Point
ASIC Application Specific Integrated Circuit
AUSF Authentication Server Function
BS Base Station
BWP Bandwidth Part
CDM Code Division Multiplexing
CP-OFDM Cyclic Prefix Orthogonal Frequency Division Multiplexing
CPU Central Processing Unit
CSI-RS Channel State Information Reference Signal
DCI Downlink Control Information
DFT-S-OFDM Discrete Fourier Transform Spread Orthogonal Frequency Division Multiplexing
DMRS Demodulation Reference Signal
DN Data Network
DSP Digital Signal Processor
eMBB Enhanced Mobile Broadband
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MCS Modulation and Coding Scheme
mmWave Millimeter Wave
MME Mobility Management Entity
MTC Machine Type Communication
MU-MIMO Multiple User Multiple Input Multiple Output
NEF Network Exposure Function
NF Network Function
NR New Radio
NRF Network Function Repository Function
NSSF Network Slice Selection Function
OCC Orthogonal Cover Code
OTT Over-the-Top
PC Personal Computer
PCF Policy Control Function
PDCCH Physical Downlink Control Channel
PDSCH Physical Downlink Shared Channel
P-GW Packet Data Network Gateway
PRB Physical Resource Block
PUSCH Physical Uplink Shared Channel
QCL Quasi Co-Located
QoS Quality of Service
RAM Random Access Memory
RAN Radio Access Network
RAT Radio Access Technology
RB Resource Block
RE Resource Element
RF Radio Frequency
ROM Read Only Memory
RRC Radio Resource Control
RRH Remote Radio Head
RTT Round Trip Time
SCEF Service Capability Exposure Function
SINR Signal to Interference plus Noise Ratio
SMF Session Management Function
TCI Transmission Configuration Indication
TDRA Time Domain Resource Allocation
TRP Transmission/Reception Point
UDM Unified Data Management
UE User Equipment
UPF User Plane Function URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method performed by a User Equipment (UE) in a cellular communications system, the method comprising:
receiving control signaling from a network for scheduling one or more Physical Downlink Shared Channel (PDSCH) transmissions, the one or more PDSCH transmissions comprise a first transmission associated with a first Transmission Configuration Indication (TCI) state and a second transmission associated with a second TCI state;
determining one or more PDSCH transmission schemes among a plurality of PDSCH transmission schemes for receiving the one or more PDSCH transmissions from the network based on:
information indicated in Downlink Control Information (DCI) scheduling the one or more PDSCH transmissions; and
information signaled to the UE via a higher layer configuration; and
receiving the one or more PDSCH transmissions in accordance with the determined one or more PDSCH transmission schemes;
wherein:
determining the one or more PDSCH transmission schemes among the plurality of PDSCH transmission schemes for receiving the one or more PDSCH transmissions comprises determining one of the following PDSCH transmission schemes:
a spatial multiplexing transmission scheme;
a frequency multiplexing transmission scheme;
a slot-based time multiplexing transmission scheme; and
a mini-slot-based time multiplexing transmission scheme;
the one or more PDSCH transmission schemes are determined based on the information indicated in the DCI scheduling the one or more PDSCH transmissions, the DCI comprises:
an antenna ports field in the DCI that indicates a number of Demodulation Reference Signal (DMRS) Code Division Multiplexing (CDM) groups to which DMRS ports indicated by the antenna ports field belong;
a transmission configuration indication field that indicates a number of TCI states to be applied to the one or more PDSCH transmissions; and
Time Domain Resource Allocation (TDRA) information indicated in the DCI, the TDRA information comprising information on a starting symbol in a respective slot for PDSCH reception and a length or duration of PDSCH reception; and
determining one PDSCH transmission scheme among the plurality of PDSCH transmission schemes comprises determining the slot-based time multiplexing scheme if:
the DCI transmission configuration indication field indicates at least two TCI states;
the antenna ports field in the DCI indicates the DMRS ports belonging to one DMRS CDM group; and
the UE is configured with the higher layer configuration to have the PDSCH duration longer than one slot.

2. The method of claim 1 wherein receiving control signaling from a network for scheduling one or more Physical Downlink Shared Channel (PDSCH) transmissions comprises receiving control signaling from a network for scheduling two or more Physical Downlink Shared Channel (PDSCH) transmissions.

3. The method of claim 1, wherein the one or more PDSCH transmission schemes are determined based on the higher layer configuration information comprising:
a number of repetitions defined in terms of multiple slots configured to the UE.

4. The method of claim 1, wherein determining the one PDSCH transmission scheme among the plurality of PDSCH transmission schemes further comprises determining the frequency multiplexing scheme if:
the DCI transmission configuration indication field indicates more than one TCI state;
the antenna ports field in the DCI indicates the DMRS ports belonging to one DMRS CDM group; and
the higher layer configuration having a value representative of a frequency multiplexing scheme.

5. The method of claim 1, wherein the first transmission and the second transmission are for a same transport block.

6. A wireless device comprising:
processing circuitry configured to:
receive control signaling from a network for scheduling one or more Physical Downlink Shared Channel (PDSCH) transmissions, the one or more PDSCH transmissions comprise a first transmission associated with a first Transmission Configuration Indication (TCI) state and a second transmission associated with a second TCI state;
determine one or more PDSCH transmission schemes among a plurality of PDSCH transmission schemes for receiving the one or more PDSCH transmissions from the network based on:
information indicated in Downlink Control Information (DCI) scheduling the one or more PDSCH transmissions; and
information signaled to the wireless device via a higher layer configuration; and
receive the one or more PDSCH transmissions in accordance with the determined one or more PDSCH transmission schemes;
wherein:
the processing circuitry is further adapted to determine one of the following PDSCH transmission schemes:
a spatial multiplexing transmission scheme;
a frequency multiplexing transmission scheme;
a slot-based time multiplexing transmission scheme; and
a mini-slot-based time multiplexing transmission scheme;
the information indicated in the DCI scheduling the one or more PDSCH transmissions comprises:
an antenna ports field in the DCI that indicates a number of Demodulation Reference Signal (DMRS) Code Division Multiplexing (CDM) groups to which DMRS ports indicated by the antenna ports field belong;
a transmission configuration indication field that indicates a number of TCI states to be applied to the one or more PDSCH transmissions; and Time Domain Resource Allocation (TDRA) information indicated in the DCI, the TDRA information comprising information on a starting symbol in a respective slot for PDSCH reception and a length or duration of PDSCH reception; and the processing circuitry is further adapted to determine that a PDSCH transmission scheme among the plurality of PDSCH transmission schemes comprises a slot-based time multiplexing scheme if:
the DCI transmission configuration indication field indicates at least two TCI states;
the antenna ports field in the DCI indicates the DMRS ports belonging to one DMRS CDM group; and
the wireless device is configured with the higher layer configuration to have the PDSCH duration longer than one slot; and power supply circuitry configured to supply power to the wireless device.

7. The wireless device of claim 6 wherein being configured to receive control signaling from a network for scheduling one or more Physical Downlink Shared Channel (PDSCH) transmissions comprises being configured to receive control signaling from a network for scheduling two or more Physical Downlink Shared Channel (PDSCH) transmissions.

8. The wireless device of claim 6, wherein the one or more PDSCH transmission schemes for receiving the one or more PDSCH transmissions are determined based on the higher layer configuration information, wherein the information signaled to the wireless device via the higher layer configuration comprises:
a number of repetitions defined in terms of multiple slots configured to the UE.

9. The wireless device of claim 6 wherein the processing circuitry is further adapted to determine that the PDSCH transmission scheme among the plurality of PDSCH transmission schemes comprises the frequency multiplexing scheme if:
the DCI transmission configuration indication field indicates more than one TCI state;
the antenna ports field in the DCI indicates the DMRS ports belonging to one DMRS CDM group; and
the higher layer configuration has a value representative of a frequency multiplexing scheme.

10. The wireless device of claim 6, wherein the first transmission and the second transmission are for a same transport block.

11. A method performed by a User Equipment (UE) in a cellular communications system, the method comprising:
receiving control signaling from a network for scheduling one or more Physical Downlink Shared Channel (PDSCH) transmissions, the one or more PDSCH transmissions comprise a first transmission associated with a first Transmission Configuration Indication (TCI) state and a second transmission associated with a second TCI state;
determining one or more PDSCH transmission schemes among a plurality of PDSCH transmission schemes for receiving the one or more PDSCH transmissions from the network based on:
information indicated in Downlink Control Information (DCI) scheduling the one or more PDSCH transmissions;
information signaled to the UE via a higher layer configuration; and
receiving the one or more PDSCH transmissions in accordance with the determined one or more PDSCH transmission schemes;
wherein:
determining the one or more PDSCH transmission schemes among the plurality of PDSCH transmission schemes for receiving the one or more PDSCH transmissions comprises determining one of the following PDSCH transmission schemes:
a spatial multiplexing transmission scheme;
a frequency multiplexing transmission scheme;
a slot-based time multiplexing transmission scheme; and
a mini-slot-based time multiplexing transmission scheme;
the one or more PDSCH transmission schemes are determined based on the information indicated in the DCI scheduling the one or more PDSCH transmissions, the DCI comprises:
an antenna ports field in the DCI that indicates a number of Demodulation Reference Signal (DMRS) Code Division Multiplexing (CDM) groups to which DMRS ports indicated by the antenna ports field belong;
a transmission configuration indication field that indicates a number of TCI states to be applied to the one or more PDSCH transmissions; and
Time Domain Resource Allocation (TDRA) information indicated in the DCI, the TDRA information comprising information on a starting symbol in a respective slot for PDSCH reception and a length or duration of PDSCH reception; and
determining one PDSCH transmission scheme among the plurality of PDSCH transmission schemes comprises determining the determining the frequency multiplexing scheme if:
the DCI transmission configuration indication field indicates more than one TCI state;
the antenna ports field in the DCI indicates the DMRS ports belonging to one DMRS CDM group; and
the higher layer configuration having a value representative of a frequency multiplexing scheme.

12. A method performed by a network node in a cellular communications system, the method comprising:
sending control signaling to a User Equipment (UE) for scheduling one or more Physical Downlink Shared Channel (PDSCH) transmissions, the one or more PDSCH transmissions comprise a first transmission associated with a first Transmission Configuration Indication (TCI) state and a second transmission associated with a second TCI state;
indicating one or more PDSCH transmission schemes among a plurality of PDSCH transmission schemes for sending the one or more PDSCH transmissions from the network based on:
information indicated in Downlink Control Information (DCI) scheduling the one or more PDSCH transmissions; and
information signaled to the UE via a higher layer configuration; and
sending the one or more PDSCH transmissions in accordance with the determined one or more PDSCH transmission schemes;

wherein:
sending the one or more PDSCH transmission schemes among the plurality of PDSCH transmission schemes for sending the one or more PDSCH transmissions comprises indicating one of the following PDSCH transmission schemes:
a spatial multiplexing transmission scheme;
a frequency multiplexing transmission scheme;
a slot-based time multiplexing transmission scheme; and
a mini-slot-based time multiplexing transmission scheme;
the one or more PDSCH transmission schemes are indicated based on the information indicated in the DCI scheduling the one or more PDSCH transmissions, the DCI comprises:
an antenna ports field in the DCI that indicates a number of Demodulation Reference Signal (DMRS) Code Division Multiplexing (CDM) groups to which DMRS ports indicated by the antenna ports field belong;
a transmission configuration indication field that indicates a number of TCI states to be applied to the one or more PDSCH transmissions; and
Time Domain Resource Allocation (TDRA) information indicated in the DCI, the TDRA information comprising information on a starting symbol in a respective slot for PDSCH reception and a length or duration of PDSCH reception; and
indicating one PDSCH transmission scheme among the plurality of PDSCH transmission schemes comprises indicating the slot-based time multiplexing scheme if:
the DCI transmission configuration indication field indicates at least two TCI states;
the antenna ports field in the DCI indicates the DMRS ports belonging to one DMRS CDM group; and
the UE is configured with the higher layer configuration to have the PDSCH duration longer than one slot.

13. The method of claim 12 wherein sending control signaling for scheduling one or more Physical Downlink Shared Channel (PDSCH) transmissions comprises sending control signaling from a network for scheduling two or more Physical Downlink Shared Channel (PDSCH) transmissions.

14. The method of claim 12, wherein the one or more PDSCH transmission schemes are indicated based on the higher layer configuration information comprising:
a number of repetitions defined in terms of multiple slots configured to the UE.

15. The method of claim 12, wherein indicating the one PDSCH transmission scheme among the plurality of PDSCH transmission schemes further comprises indicating the frequency multiplexing scheme if:
the DCI transmission configuration indication field indicates more than one TCI state;
the antenna ports field in the DCI indicates the DMRS ports belonging to one DMRS CDM group; and
the higher layer configuration having a value representative of a frequency multiplexing scheme.

16. The method of claim 12, wherein the first transmission and the second transmission are for a same transport block.

17. A method performed by a network node in a cellular communications system, the method comprising:
sending control signaling to a User Equipment (UE) for scheduling one or more Physical Downlink Shared Channel (PDSCH) transmissions, the one or more PDSCH transmissions comprise a first transmission associated with a first Transmission Configuration Indication (TCI) state and a second transmission associated with a second TCI state;
indicating one or more PDSCH transmission schemes among a plurality of PDSCH transmission schemes for sending the one or more PDSCH transmissions based on:
information indicated in Downlink Control Information (DCI) scheduling the one or more PDSCH transmissions;
information signaled to the UE via a higher layer configuration; and
sending the one or more PDSCH transmissions in accordance with the indicated one or more PDSCH transmission schemes;
wherein:
indicating the one or more PDSCH transmission schemes among the plurality of PDSCH transmission schemes for receiving the one or more PDSCH transmissions comprises indicating one of the following PDSCH transmission schemes:
a spatial multiplexing transmission scheme;
a frequency multiplexing transmission scheme;
a slot-based time multiplexing transmission scheme; and
a mini-slot-based time multiplexing transmission scheme;
the one or more PDSCH transmission schemes are indicated based on the information indicated in the DCI scheduling the one or more PDSCH transmissions, the DCI comprises:
an antenna ports field in the DCI that indicates a number of Demodulation Reference Signal (DMRS) Code Division Multiplexing (CDM) groups to which DMRS ports indicated by the antenna ports field belong;
a transmission configuration indication field that indicates a number of TCI states to be applied to the one or more PDSCH transmissions; and
Time Domain Resource Allocation (TDRA) information indicated in the DCI, the TDRA information comprising information on a starting symbol in a respective slot for PDSCH reception and a length or duration of PDSCH reception; and
indicating one PDSCH transmission scheme among the plurality of PDSCH transmission schemes comprises indicating the frequency multiplexing scheme if:
the DCI transmission configuration indication field indicates more than one TCI state;
the antenna ports field in the DCI indicates the DMRS ports belonging to one DMRS CDM group; and
the higher layer configuration having a value representative of a frequency multiplexing scheme.

\* \* \* \* \*

UNITED STATES PATENT AND TRADEMARK OFFICE
CERTIFICATE OF CORRECTION

PATENT NO. : 12,156,209 B2  
APPLICATION NO. : 17/867168  
DATED : November 26, 2024  
INVENTOR(S) : Siva Muruganathan et al.

Page 1 of 1

It is certified that error appears in the above-identified patent and that said Letters Patent is hereby corrected as shown below:

In the Claims

In Column 38, Line 39, delete "the determining", therefor.

In Column 38, Line 59, delete "based on", and replace it with --using-- therefor.

In Column 38, Line 66, delete "determined", and replace it with --indicated-- therefor.

In Column 39, Line 14, delete "based on", and replace it with --using-- therefor.

In Column 39, Line 49, delete "based on", and replace it with --using-- therefor.

Signed and Sealed this  
Thirteenth Day of May, 2025

Coke Morgan Stewart  
*Acting Director of the United States Patent and Trademark Office*